(12) United States Patent
Lensgraf et al.

(10) Patent No.: US 10,399,280 B1
(45) Date of Patent: Sep. 3, 2019

(54) METHOD AND SYSTEM FOR RAPID AND EFFICIENT THREE-DIMENSIONAL PRINTING

(71) Applicants: Sam Lensgraf, Chattanooga, TN (US); Ramgopal Mettu, New Orleans, LA (US)

(72) Inventors: Sam Lensgraf, Chattanooga, TN (US); Ramgopal Mettu, New Orleans, LA (US)

(73) Assignee: THE ADMINISTRATORS OF THE TULANE EDUCATIONAL FUND, New Orleans, LA (US)

( * ) Notice: Subject to any disclaimer, the term of this patent is extended or adjusted under 35 U.S.C. 154(b) by 305 days.

(21) Appl. No.: 15/582,346

(22) Filed: Apr. 28, 2017

Related U.S. Application Data

(60) Provisional application No. 62/329,303, filed on Apr. 29, 2016.

(51) Int. Cl.
*B33Y 10/00* (2015.01)
*B33Y 30/00* (2015.01)
*B33Y 50/02* (2015.01)
*B29C 67/00* (2017.01)

(52) U.S. Cl.
CPC ...... *B29C 67/0088* (2013.01); *B29C 67/0059* (2013.01); *B29C 67/0092* (2013.01); *B33Y 10/00* (2014.12); *B33Y 30/00* (2014.12); *B33Y 50/02* (2014.12)

(58) Field of Classification Search
CPC ............ B29C 67/0088; B29C 67/0059; B29C 67/0092; B33Y 10/00; B33Y 30/00; B33Y 50/02
See application file for complete search history.

(56) References Cited

U.S. PATENT DOCUMENTS

2003/0236588 A1* 12/2003 Jang ................. B82Y 30/00
700/119
2016/0014906 A1* 1/2016 Ilic .................... H05K 3/12
427/98.4
2016/0288426 A1* 10/2016 Yoshida ............ G05B 19/4099

* cited by examiner

*Primary Examiner* — Robert E Fennema
*Assistant Examiner* — Chad G Erdman
(74) *Attorney, Agent, or Firm* — Polsinelli PC

(57) ABSTRACT

A three dimensional (3D) printing system includes computer-executable instructions for obtaining a volumetric object representation file, parsing the volumetric object representation file into multiple layers, and for each layer, decomposing the layer into a sequence of continuous paths, aggregating non-continuous sets of tool paths with a single outer path and zero or more open or closed inner paths into islands, and generating one or more motion segments according to each island. Once generated, the motion segments may be aggregated to form a toolpath, which is used by the three dimensional printer to print a 3D model. Other embodiments may employ.

18 Claims, 12 Drawing Sheets

METHOD AND SYSTEM FOR RAPID AND EFFICIENT THREE-DIMENSIONAL PRINTING

CROSS REFERENCE TO RELATED APPLICATIONS

This application claims priority under 35 U.S.C. § 119 to U.S. Patent Application Ser. No. 62/329,303, filed Apr. 29, 2016, which is entitled "An Improved Method and System For Rapid and Efficient Three-Dimensional Printing." The contents of 62/329,303 are incorporated herein by reference in their entirety.

TECHNICAL FIELD

Aspects of the present disclosure relate to printing devices and, in particular, to a method and system for rapid and efficient three-dimensional printing.

BACKGROUND

Existing approaches to three-dimensional (3D) printing take as input a 3D model and produce a plan for creating the 3D model that is essentially a layer-by-layer decomposition of the input model.

The rise of additive manufacturing has given users unprecedented freedom and flexibility in manufacturing objects of arbitrary geometry. In general, the object is created by a computational determination of a toolpath which is executed by a 3D printer. Fused deposition modeling (FDM), a widely used form of additive manufacturing, builds a model incrementally by depositing substrate that becomes fused to other, already extruded substrate. FDM allows more flexibility in choice of material than other methods of additive manufacturing but sacrifices speed in doing so. A major limitation of this approach is the large amount of machining time (hours to days) that is required to print complex parts. As a typical example, for models with multiple distinct parts, the printer typically spends a large fraction of its time traveling between extrusions. The standard toolpath generation process exacerbates the problem since the printer must complete all instructions on a given layer before moving on to the next.

Toolpath generation for 3D printers inherits directly from the computerized numerical control (CNC) milling problem. Current path planning algorithms for 3D printers utilize the iso-planar toolpath generation technique in its adaptive and non-adaptive forms. Adaptive iso-planar toolpath generation changes the layer height used to describe a model according to the surface complexity of the part which can reduce total manufacturing time.

The (nonadaptive) iso-planar technique takes a model from a CAD application and slices it with parallel planes yielding a series of contours. These contours can then be approximated by a series of contact points which the printerhead must interpolate. Several techniques have been proposed to apply optimization procedures to toolpaths to reduce the total airtime needed to produce a part, but they only consider the toolpath in a single layer. This negatively affects production time because this approach introduces wasted motion in which printer is not actually printing. Consequently, the printerhead must move farther to print out the same model and each motion costs some additional amount of time and energy.

SUMMARY OF THE INVENTION

According to some embodiments, a three dimensional (3D) printing system includes computer-executable instructions for obtaining a volumetric object representation file, parsing the volumetric object representation file into multiple layers, and for each layer, decomposing the layer into a sequence of continuous paths, aggregating non-continuous sets of tool paths with a single outer path and zero or more open or closed inner paths into islands, and generating one or more motion segments according to each island. Once generated, the motion segments may be aggregated to form a toolpath, which is used by the three dimensional printer to print a 3D model.

According to some embodiments, a three dimensional printing system includes computer-executable instructions for obtaining a volumetric object representation file, parsing the volumetric object representation file into multiple contours including multiple line segments. The instructions may then arrange the contours in a dependency graph comprising multiple vertices representing the contours, and edges each representing a dependency of a first vertex relative to a second vertex. Next, the instructions iteratively traverses the dependency graph to re-arrange each vertex according to a minimum Euclidean distance between each of the contours represented by the vertices, and generates a toolpath from the dependency graph, wherein the toolpath is used by the three dimensional printer to print a model defined by the volumetric object representation file.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION OF THE INVENTION

Figure 1:
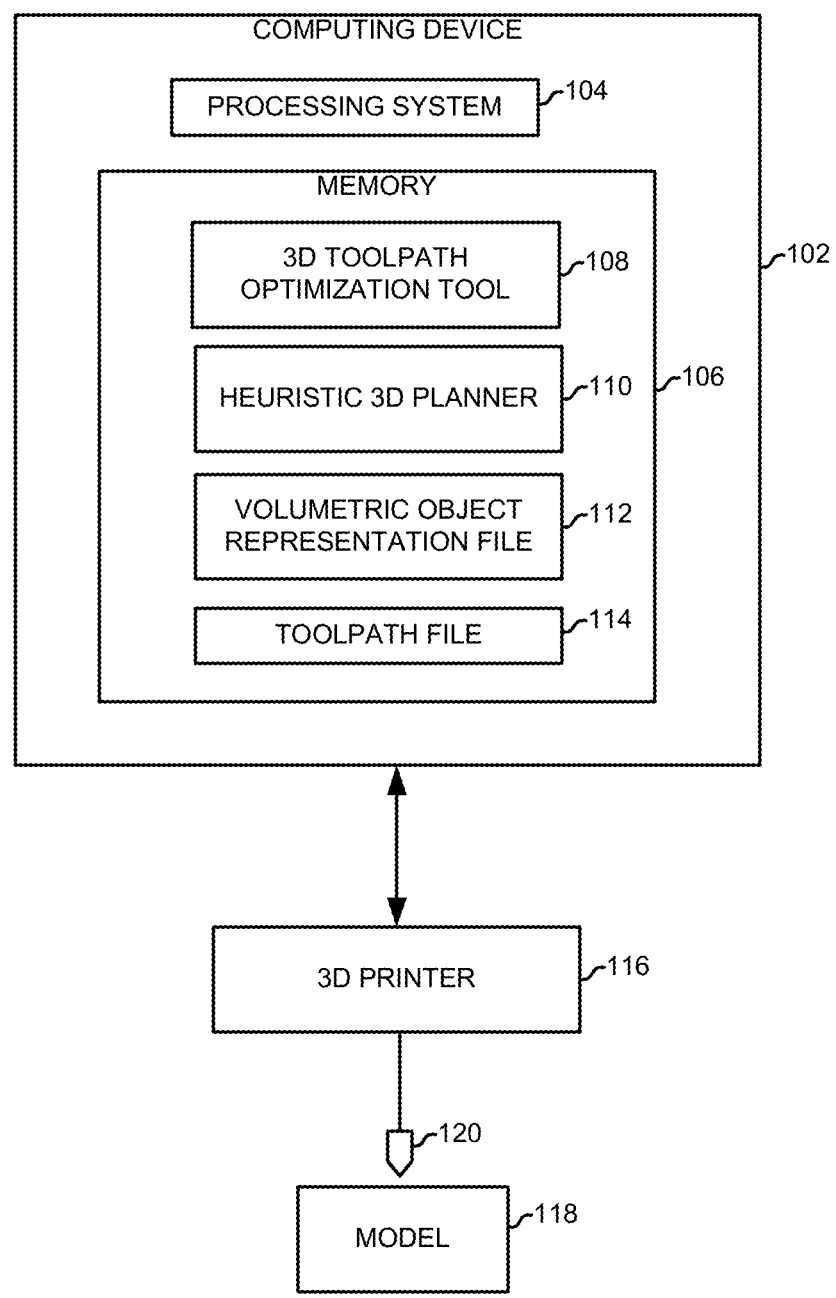
FIG. 1 illustrates an example three-dimensional (3D) printing system according to embodiments of the present disclosure.

Detailed descriptions of one or more embodiments of a method and system for rapid and efficient three-dimensional printing are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate manner.

Wherever any of the phrases "for example," "such as," "including" and the like are used herein, the phrase "and without limitation" is understood to follow unless explicitly stated otherwise. Similarly "an example," "exemplary" and the like are understood to be non-limiting.

The term "substantially" allows for deviations from the descriptor that do not negatively impact the intended purpose. Descriptive terms are understood to be modified by the term "substantially" even if the word "substantially" is not explicitly recited. Therefore, for example, the phrase "wherein the lever extends vertically" means "wherein the lever extends substantially vertically" so long as a precise vertical arrangement is not necessary for the lever to perform its function.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a process involving steps a, b, and c" means that the process includes at least steps a, b and c. Wherever the terms "a" or "an" are used, "one or more" is understood, unless such interpretation is nonsensical in context.

Definitions

The term "motion segment" describes an abstraction that results from processing long, linear toolpaths. Specifically, it is a directed line segment specified by its 3D end points where it has a first end that signifies the beginning of the motion of the printerhead and a second end that marks the end of the motion of the printerhead. In some embodiments, a segment also stores a variable type that is either "print" or "travel", where "print" refers to printed motion and "travel" refers to non-printed motion. In some embodiments, a segment between two islands is defined by piercing points that in some embodiments can be connected between the two islands via a straight line.

An "island" is a grouping of printed motion segments with an outer contour that contains all other segments in the island. An island occurs in a single layer. Islands are completely printed before they are left by the printerhead through a piercing point.

The term "piercing points" refers to the points at which the printerhead exits or enters an island.

The term "tool geometry" refers to the physical dimensions of the printerhead used on the 3D printing hardware. In some embodiments, the tool geometry can also be generated and imposed on the movement of the printerhead as a set of geometric movement limitations so that the printerhead is geometrically aware. In these embodiments, the term "bounding box of the printerhead" or "volumetric representation of the printerhead" may also be used.

"Chunking" is the aggregation of the islands of printed segments in the model into sets. A "chunk" is a stack of layers such that the islands in each layer of the chunk make up its contents.

The term "final path" is an ordered list of points that the printerhead must traverse along with hardware control information including temperatures for various elements of the printer and the feed rate of each of the motors.

Embodiments

In some embodiments, the present invention provides an improved method of additive manufacturing using a 3D printer.

In some embodiments, the present invention provides an improved method of fused deposition modeling that reduces extrusionless printerhead travel, print time, and energy consumption.

In some embodiments, the present invention provides a method of controlling the printerhead of a 3D printer to print an object. In some embodiments, the present invention controls the printerhead during the printing process to minimize extrusionless printerhead travel, reduce print time, and decrease energy consumption, while eliminating printerhead collisions with the object being printed.

In some embodiments, the present invention provides an improved method of generating a toolpath in which the printer moves in all three dimensions to reduce printerhead travel time. In some embodiments, the present method comprises the following steps: selecting and inputting volumetric object representation; generating extrusionless toolpaths based on the 3D model; dividing the extrusionless toolpath layers into conveniently printable islands; meaningfully abstracting a single, collisionless toolpath depending on the localities of the islands and geometric constraints; transferring the path from an internal representation to an appropriate machine readable representation with temperature and printer specific information; and efficiently printing a 3D object. In some embodiments, the method employs a number of subroutines to optimize this process.

In some embodiments extrusionless toolpaths are created by converting the digital 3D model file into a sequence of motion segments ordered by the associated layer of each segment; parsing the motion segments to remove all travel type segments; and aggregating the raw sequence of printed motions into sequential layers of extrusionless toolpath segments. In some embodiments motion segments are G-code instructions. In some embodiments dividing the extrusionless toolpath layers into conveniently printable islands comprises of decomposing a layer into a sequence of continuous printed paths, labeling the paths as open or closed, and aggregating non-continuous sets of paths with a single outer path and zero or more open or closed inner paths into islands. A sequence of motion segments are continuous if for each pi, pj∈P Dist(pi, pj) is less than E for i=j−1, where Dist(pi, pj) measures the Euclidean distance between the end point of pi and the starting point of pj. The paths are labeled as either closed or open paths when a path P=p1, p2, . . . , pn is labeled as closed if Dist(pn, p1) is less than E, otherwise P is said to be open.

In some embodiments, meaningfully abstracting a single path comprises imposing physical constraints on the order in which the islands are printed, combining the islands into a toolpath, and optimizing the toolpath in consideration of the physical measurements of the printerhead or a volumetric representation thereof. In some embodiments imposing physical constraints on the order in which islands are printed comprises storing a set dependencies in each island object. In some embodiments the set of dependencies comprises of ensuring that while the printerhead is following all of the paths in an island, it will not collide with another island; and that when an island is printed, it will be resting on all islands that are a part of its support structure. In some embodiments, an "island" i is dependent on another island j if the expanded axis aligned bounding box of j intersects the axis aligned bounding box of i and j is in the layer directly preceding it. In some embodiments, the final path is optimized by chunking the input model by height considering the bounding box of the printerhead.

In some embodiments generating a toolpath consists of the following steps: vertically slicing a triangulated mesh is by a set of planes yielding a series of contours; ordering the contours to yield the closed outer walls of the model as continuous paths (or "islands"); generating offset surfaces in each of the islands; creating an infill path in each of the islands; liking the islands to form a final toolpath; transferring the final toolpath from an internal representation to an appropriate machine readable representation with the hardware information.

The system generates an infill structure to fill certain voids in the printed model with material to strengthen the model. Methods altering the infill structure to increase manufacturing efficiency are an important step in improving part strength and manufacturing time, but they are incomplete solutions. One method expedites the process by reducing the required amount of support volume. Support structures are added in the toolpath generation process to keep the output model from deviating from the original mesh. In many models this support structure can drastically increase print time. However, changing the infill only reduces the volume of the printed material, but does not actually reduce wasted motion. In contrast, the present method assumes a constant support structure and can be used effectively with support structure reducing techniques. Thus, the present method is in an entirely different class of printing optimization methods from methods altering infill structure. Indeed, it could be used on top of infill altering method to achieve further gains.

In some embodiments a volumetric object representation is any set of data used to represent an object that has a volume. In some embodiments representations include STL format, voxel based formats, and internal CAD software representations.

In some embodiments hardware specific information is selected from one or more of the following: the feed rate for each of the servo motors in the printer hardware, the temperature of the nozzle and printerhead; and the pre-print adjustments of the printer hardware according to the present method. The feed rate means the speed of the servo motors.

FIG. 1 illustrates an example three-dimensional (3D) printing system 100 according to some embodiments of the present disclosure. The system includes a computing device 102 having a processing system 104 and a memory 106 for storing a 3D toolpath optimization tool 108 and a heuristic 3D planner 110. The tool 108 obtains a volumetric object representation file 112 stored in the memory 106, and generates a toolpath file 114 that is a machine readable representation of a toolpath that can be used by a 3D printer 116 to create a model 118. As will be described in detail herein below, the tool 108 generates the toolpath file 114 in a manner to, among other things, reduce printerhead travel time by moving a printerhead 120 in three dimensions to reduce extrusionless time.

Embodiments of the present disclosure may provide an improved system and method of fused deposition modeling that reduces extrusionless printerhead travel, print time, and energy consumption. Those embodiments may also provide a system and method of controlling the printerhead of a 3D printer to print an object. Those embodiments may also control the printerhead during the printing process to minimize extrusionless printerhead travel, reduce print time, and decrease energy consumption, while eliminating printerhead collisions with the object being printed.

The system 100 creates extrusionless toolpaths by converting the volumetric object representation file 112 into a sequence of motion segments ordered by the associated layer of each segment, parsing the motion segments to remove some, most, or all travel type segments, and aggregating the raw sequence of printed motions into sequential layers of extrusionless toolpath segments. In some embodiments a volumetric object representation is any set of data used to represent an object that has a volume. In some embodiments representations include STL format, voxel based formats, and internal CAD software representations.

According to some aspects of the present technology, the memory 106 includes a tangible and non-transitory computer readable media on which the tool 108 is stored in the form of computer executable instructions. The tool 108 includes instructions or modules that are executable by the processing system 104 to perform the features of the differentiated routing system 100 described herein. The computer readable media may include volatile media, nonvolatile media, removable media, non-removable media, and/or another available media that can be accessed by the computing device 102.

The described technology may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

Figure 2:
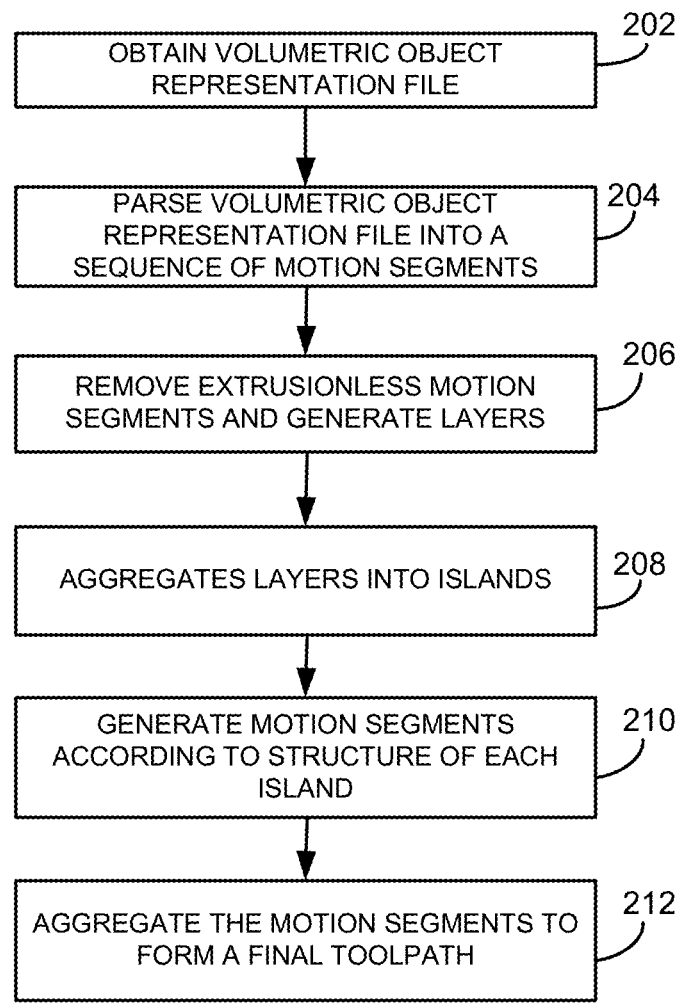
FIG. 2 describes a process that may be performed by the tool to generate a toolpath file based upon a volumetric object representation according to embodiments of the present disclosure.

FIG. 2 describes a process that may be performed by the tool 108 to generate a toolpath file 114 based upon a volumetric object representation 112 according to embodiments of the present disclosure.

Initially at step 202, the tool 108 obtains a volumetric object representation 112. The system 100 may obtain the volumetric object representation file 112 in any suitable manner. In some embodiments, the volumetric object representation file 112 includes motion segments (e.g., G-code instructions) that are configured to function with the conventional iso-planar 3D printing technique. The tool 108 then parses the volumetric object representation 112 into a sequence of motion segments in the order that they occur in the file by combining the endpoints of the motion segments at step 204.

At step 206, the tool 108 removes extrusionless motion segments. For example, the tool 108 may iterate a given sequence and remove all motion segments that are extrusionless (e.g., do not apply substrate material). The tool 108 also aggregates the raw sequence of printed motions into a sequence of layers. The tool 108 aggregates the layers into islands at step 208. The islands are sets of motions in a single layer which are contained by a closed outer path. All parts that feature closed walls can be conveniently decomposed into islands. In order to decompose a layer into islands, the tool 108 may initially decompose the layer into a sequence of continuous printed paths.

Thereafter at step 210, the tool 108 generates one or more motion segments according to each island, and aggregates each of the generated motion segments to form a toolpath at step 212.

The previous steps may be repeatedly performed for forming other toolpaths according to other volumetric object representation files 108. Nevertheless, when use of the tool 108 is no longer needed or desired, the process ends.

In general, it would be desirable to devise a simple, easily implementable method that avoids extrusionless travel within and between layer deposition during additive manufacturing, because existing printers can be made faster and less energy consumptive. The present invention discloses a faster, more efficient method for printing a 3D object with minimal wasted motion of the printerhead. The method utilizes toolpath segmentation and local dependencies between parts of the model to ensure that printing and movement of the printerhead in three dimensions produces the target model and is collision-free. This is the first 3D printing method that uses local dependencies to be applied to FDM toolpath generation. The present method generates toolpaths that leverages tool geometry to reduce fabrication time. The algorithm employed as a component of the present method is simple, requires an order of magnitude less time than slicing, and works with compact geometric approximations of the printerhead and carriage.

Figure 3:
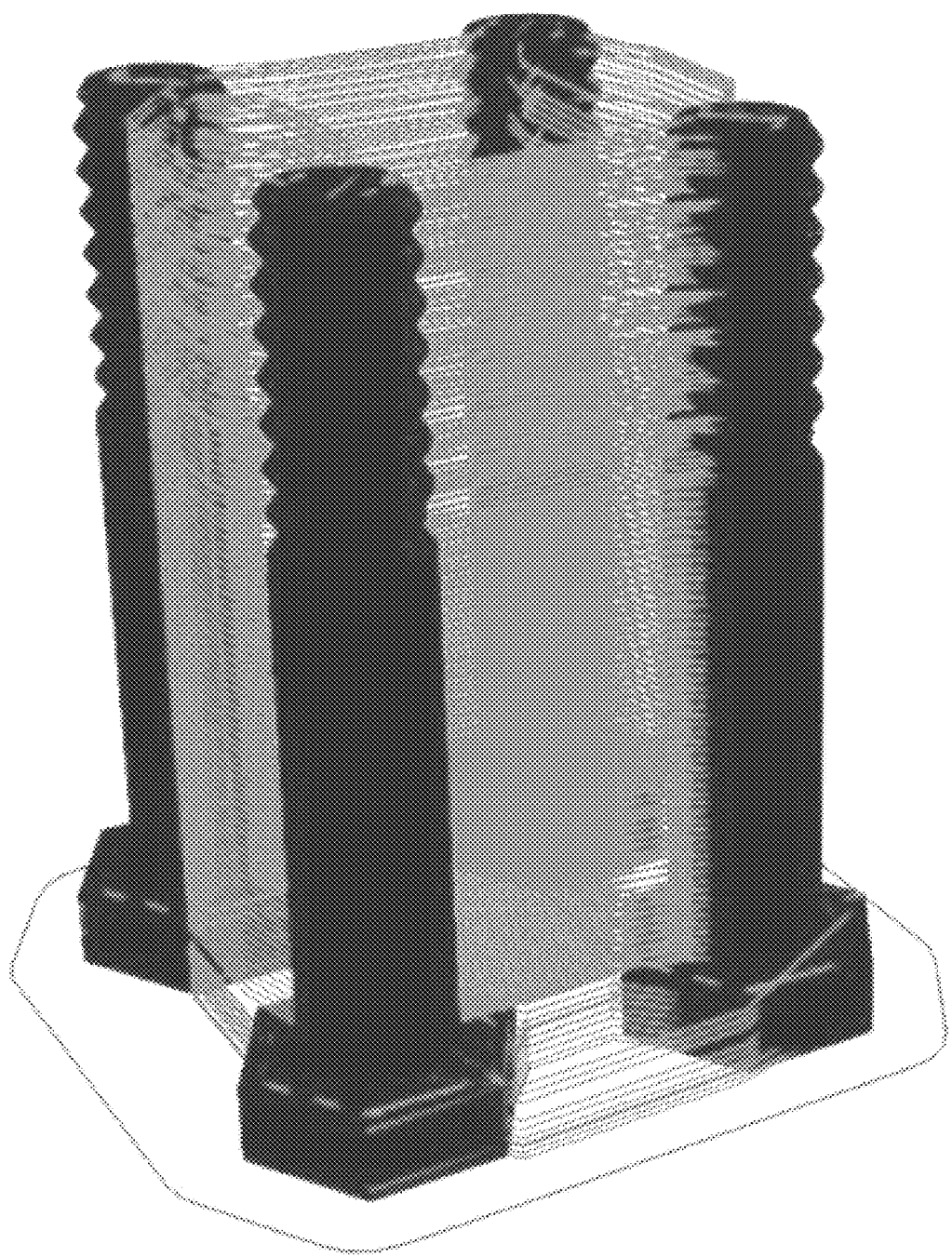
FIG. 3 depicts an example toolpath made for four identical screws.

For example, FIG. 3 depicts an example toolpath made for four identical screws. This is a pathological example for layer-by-layer printing, since each layer incurs wasted motion and thus the extrusionless travel scales as the volume of the bounding box of the model. For the model in FIG. 3 extrusionless travel accounts for 55375.6 mm of the total 317030.0 mm of motion required to print the model, or about 18% of the total motion. This accounts for a significant portion of both the time and energy required during printing. The proposed method can, with appropriate printer geometry, significantly improve upon such examples. A favorable printer geometry is one which meaningfully abstracts the printerhead with a small bounding box. Any printerhead that hangs below the extruder can be abstracted. For example, when using a certain printer used to print the models in FIGS. 3 and 6 for testing, a 7 mm×7 mm×7 mm bounding box around the nozzle that hangs just below the rest of the extruder is created. As a result, the extruder geometry admits substantial savings over a large benchmark of models from popular open source mesh websites. In addition, the method has also successfully saved time when printing paths generated by the algorithm using an open source FDM machine.

Since traditional FDM printing proceeds layer-by-layer, it is easy to see that the target object can always be printed correctly (subject to support constraints). Since the present invention diverges from traditional methods, we first define our notion of printability. To print a target object, its path must be printable. A path is printable if all parts of the path have a proper support structure and if the printerhead will not intersect already printed parts of the model while traversing the path. This is achieved by computing toolpath segments in each layer and then combining these into a 3D-aware toolpath that minimizes extrusionless travel. Specifically, this is done by abstracting the toolpath, and imposing a set of geometric constraints based on a notion of local dependence (and thus, printability).

Since the generation of toolpath segments in each layer of the input model is straightforward, for simplicity the present method assumes that it is given a set of motion segments (i.e., G-code instructions) and the associated layer of each segment. To test this method, the present disclosure used a Slic3r path generating software package. The Slic3r path generator is open-source and follows the iso-planar technique. Table 1, and related description below briefly describes the input parameters used in the algorithm and their use. First, the input segments are parsed. Next, the layers are divided into islands, or portions of the path that are convenient to print together. Then, each island is assigned a set of dependencies that must be met before it can be put onto the final path. Finally, the islands are combined into a final toolpath. Algorithm 1 (Optimize) gives a top-down overview of the complete algorithm. Optimize also makes use of a number of subroutines as described below. Table 1 describes a list of inputs and their usage.

TABLE 1

List of inputs and their usage.

| Input | Type | Brief Description |
|---|---|---|
| F | Write | Denotes the input g-code file. |
| E | Greedy GetPaths ToContinuousPath | Denotes the tolerance used to create and find continuous paths. |
| h | BufferedGreedy | The height of the bounding box of the print ahead. |
| r | CalculateDependencies | One half of the side length of the bounding box of the printerhead. |

Algorithm 1: Optimize. Imports and optimizes a toolpath F

Input: A toolpath F, a specified tolerance E, the radius of the extruder bounding box r, the height of the extruder bounding box h
Output: A greedily optimized g-code file.
1: procedure Optimize(F, E, r, h)
2:    segments ← Parse(F)
3:    segments ← RemoveExtrusionless(segments)
4:    layers ← CreateLayers(segments)
5:    islands ← ∅
6:    for i = 0, . . . , len(layers) do
7:       islands [i] ← CreateIslands(layers[i], E)
8:    end for
9:    for k = 0, . . . , len(islands[0]) do   ▷ The islands in the bottom layer have no dependencies.
10:       islands[0][k].D ← ∅
11:    end for
12:    i ← 1
13:    for i = 1, . . . , len(islands) do
14:       j ← i − 1

Algorithm 1: Optimize. Imports and optimizes a toolpath F

```
15:        for k = 0, . . . , len(islands[i]) do
16:            islands [i][k].D ← CalculateDependencies(islands[i][k],
               islands[j], r)
17:        end for
18:    end for
19:    for i = 0, . . . , len(islands) do
20:        for j = 0, . . . , len(islands[i]) do
21:            ToContinuousPath(islands[i][j])
22:        end for
23:    end for
24:    outputSegments ← BufferedGreedy(islands, h)
25:    return outputSegments
26: end procedure
```

In some embodiments, generating a toolpath consists of the following steps: obtaining a volumetric object representation; V is sliced by a series of parallel planes yielding a list of 2D contours; the 2D contours are grouped into islands; the islands are stored as graph G=(V,E) where E=(vi, vj) represents the shortest extrusionless motion between the outer edges of the islands i and j; dependencies are calculated for each islands; the islands are grouped into a series of chunks; an ordering of islands is selected by traversing G according to the dependency set; each island is connected to the next in some embodiments using a collision avoidance sub procedure and the piercing points are determined by the corresponding edge; infill structure is generated; hardware specific information is generated; and hardware specific information is translated into a machine readable interface.

For clarity, we briefly describe how the algorithm represents the given set of motion segments in F. Parse converts the input file to a sequence of motion segments in the order that they occur in the file by combining the contact points in F. A motion segment (hereinafter "segment") l is a directed line segment specified by its 3D end points where l.b marks the beginning of the motion and l.e marks the end of the motion. A segment also stores a type variable type that is either print or travel where print refers to printed motion and travel refers to non-printed motion.

As shown in Algorithm 1, the RemoveExtrusionless function iterates through the given sequence and removes all motion segments with the type travel. The CreateLayers function aggregates the raw sequence of printed motions into a sequence of layers. A layer L is a sequence of motion segments ii with li.b.z=li.e.z=lj.b.z=lj.e.z ∀li, lj∈L. It is assumed that the layers in the sequence layers in Algorithm 1 are in ascending order of their z values. The tool 108 aggregates the layers into islands at step 208. The Islands are sets of motions in a single layer which are contained by a closed outer path. All parts that feature closed walls can be conveniently decomposed into islands. In order to decompose a layer into islands, the algorithm first decomposes the layer into a sequence of continuous printed paths, such as by using the GetPaths function of Algorithm 1.

RemoveExtrusionless iterates through the given sequence and removes all segments with the type travel. CreateLayers aggregates the raw sequence of printed motions into a sequence of layers. A layer L is a sequence of motion segments li with li.b.z=li.e.z=lj.b.z=l j.e.z ∀li, lj∈L. It is assumed that the layers in the sequence layers in Algorithm 1 are in ascending order of their z values.

Figure 4:
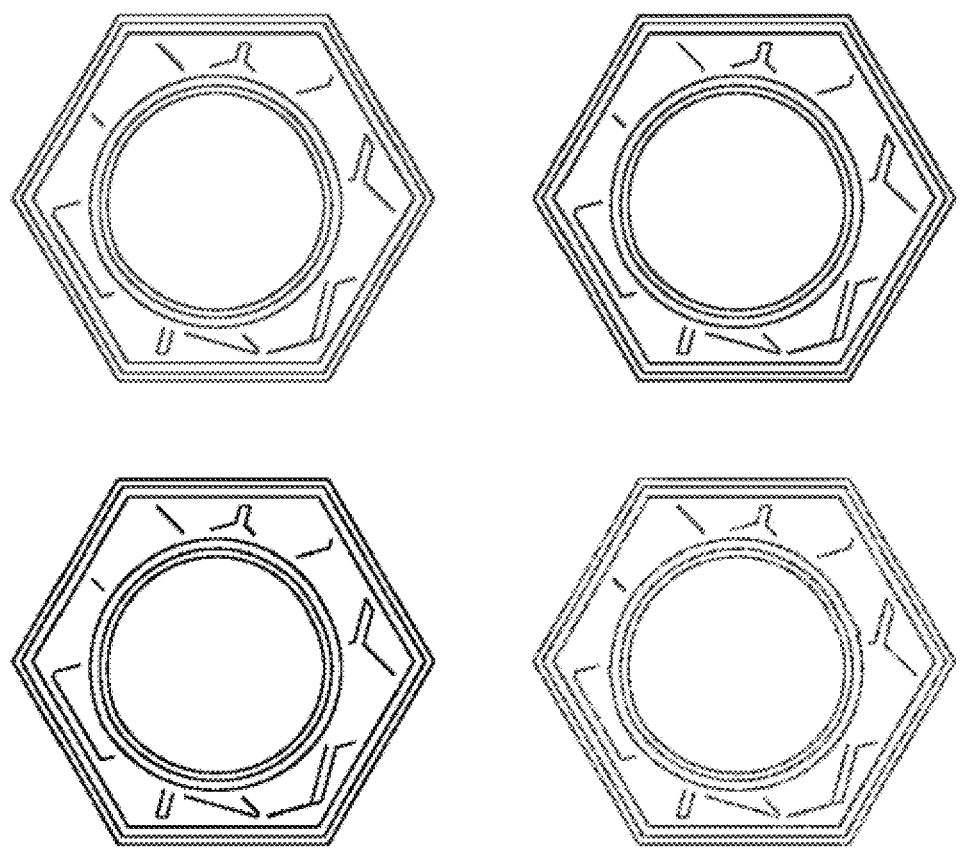
FIG. 4 shows an example of four islands in a layer that may be formed from the screws of FIG. 3.

Islands are sets of motions in a single layer which are contained by a closed outer path. FIG. 4 shows an example of four islands in a layer that may be formed from the screws of FIG. 3. All parts that feature closed walls can be conveniently decomposed into islands. In order to decompose a layer into islands, the algorithm first decomposes the layer into a sequence of continuous printed paths using GetPaths.

A sequence of motion segments $P=p1, p2, \ldots, pn$ is continuous if for each $pi, pj \in P$ Dist(pi, pj) is less than E for $i=j-1$, where Dist(pi, pj) measures the Euclidean distance between the end point of pi and the starting point of pj. A continuous sequence of motion segments is referred to hereafter as a path.

GetPaths creates a sequence of paths from the original sequence of motion segments in the layer via a linear scan, breaking the original sequence at places where the segments are far enough apart. As paths are created, they are labeled as either closed or open paths according to the following definition: A path $P=p1, p2, \ldots, pn$ is labeled as closed if Dist(pn, p1) is less than E, otherwise P is said to be open.

As seen in FIG. 4, an island can be understood as a closed outer path that contains several open or closed inner paths where the solid walls of the model form the outermost path.

An island I is non-continuous set of paths with a single outer path and zero or more open or closed inner paths. The outer path contains all of the inner paths and is contained by no other path in the layer. Inner paths may contain other paths but must be contained by the outer path. Open paths may be the outer path of an island only in the case that they are contained by no other path.

A path p1 contains another path p2 if p1 is closed and p2 occurs entirely inside of p1. That is, if all points of p2 are inside of p1. It is assumed that the paths do not cross, so if p2 is contained in p1, $p^2$ does not cross p1. So, Contains(p1, p2) may simply verify whether p2[0].b is contained in p1 via the winding number method [1], a point in polygon algorithm that works in linear time for arbitrary polygons. This method operates by calculating how many times a polygon winds around a given point. If the polygon winds around the point a nonzero number of times, the point is contained in the polygon. If p1 is open, Contains will return false.

Pseudocode for the algorithm to decompose a layer into a sequence of islands is presented in Algorithm 2. CreateIslands operates by selecting a candidate outer path o for an island and scanning through the list of paths in the layer searching for paths that it contains and adding those incrementally to an island, removing them from the input list as they are encountered. If a path that contains o is found, that path becomes the candidate outer, and the iteration begins again. A special case where a layer contains no closed paths is handled by creating a single island from the layer. This occurs in layers that are generated as "raft" layers by the path generator.

In the worst case each path pi is neither contained by nor contains another path. In such a case, the procedure must check each path remaining in the list for each iteration. Where it is assumed that Contains takes at most some constant time C, this procedure runs in O(n2) time where n is the number of paths in the layer.

Algorithm 2: CreateIslands. Constructs a list of islands for a given layer object.

```
Input: A layer object L, the tolerance for continuity E.
Output: A list of island
    objects r. 1: procedure
    CreateIslands(L, E)
    2:   paths ←
    GetPaths(L, E)
    3:   curI sland ← ∅
    4:   curPath ← ∅
```

Algorithm 2: CreateIslands. Constructs a list of islands for a given layer object.

```
5:     r ← ∅
6:     allOpen ← true              ▷Detect special raft layer case
7:     for all p ∈ paths do
8:         allOpen ← allOpen ∧ p.open
9:     end for
10:    if allOpen then
11:        curIsland ← paths
12:        return curIsland
13:    end if
14:    while paths * ∅ do           ▷ While loop to detect all islands containing or contained by other islands.
15:        curIsland ← ∅
16:        outer ← paths[0]
17:        paths.erase(paths[0])
18:        for each p ∈ paths do
19:            if Contains(outer, p) then
20:                curIsland.add(p)
21:                paths.erase(p)
22:            else if Contains(p, outer) then
23:                curIsland.add(p)
24:                outer ← p
25:                paths.erase(p)
26:                p ← paths[0]
27:            else
28:                move p to the next path in paths
29:            end if
30:        end for
31:        r.add(curIsland)
32:    end while
33:    return r
34: end procedure
```

Now that the layers have been divided into sequences of islands, the post-processor must impose physical constraints on the order in which the islands are printed. These constraints ensure the integrity of the output model. Specifically, they ensure that while the printerhead is following all of the paths in an island it will not collide with another island, and that when an island is printed, it will be resting on all islands that are a part of its support structure. It is assumed that the support structure of an island is adequate in the input model. These constraints are realized by storing a set of dependencies D in each island object that must be printed before the island in question can be printed.

The printerhead is modeled by a rectangular volume that fully contains the region identified by the user as the collision region C. Filament is extruded from the middle of this rectangular volume. C has side length equal to 2r and height h. For example, on the printer fitted with an extruder used for our physical tests, this region has a width and length of 7 mm and a height of 7 mm. This region is defined as being over the nozzle that rides lower down than the rest of the carriage.

Ideally, when calculating the dependencies of island i, C is swept along the outer path of each island j to generate jc in the layer I preceding i. i is then dependent on all jc∈1 which it intersects. To make calculation simpler and speed implementation, an expanded axis aligned box which contains jc is calculated and tested for intersection instead. This expanded box is obtained by moving all four points of the box a distance of r in the x and y axes.

CalculateDependencies (Algorithm 3) populates the dependency set of each island according to the following definition. An island i is dependent on another island j if the expanded axis aligned bounding box of j intersects the axis aligned bounding box of i and j is in the layer directly preceding it. The inputs to this procedure are an island I which is to have its dependency list populated, a sequence of the islands in the layer before 1, L, and the radius of the printerhead r. For each island i in L, the algorithm checks whether the bounding box of I intersects the bounding box of i.

BoundingBox(I, r) works by locating the extreme points of the outer path of I and storing them. r is the expansion factor and is subtracted from the minimum x and y values of the box and added to the maximum values. If no r is provided, r defaults to 0. Intersection(b1, b2) returns true if the two axis aligned boxes b1 and b2 intersect each other. CalculateDependencies runs in time linear in the number of islands in L, where it is assumed that the length of the outer path of each is bounded by some constant C.

Algorithm 3: CalculateDependencies. Calculates the dependencies for each island in each layer of the model.

```
Input: An island I, the sequence of islands in the layer preceding I, L,
and the radius of the printerhead r.
Output: I.D contains the ID number of all islands in L on which I
is dependent.
1: procedure CalculateDependencies(I,L,r)
2:     i ← 0
3:     d ← ∅
4:     for i < len(L) do
5:         if Intersection(BoundingBox(I), BoundingBox(L[i], r)) then
6:             d.add(L[i].ID)
7:         end if
8:     end for
9:     I.D ← d
10: end procedure
```

After dependencies are calculated, islands may be combined into a final continuous path containing both extrusionless travel and printed motions. First, the printed paths in each island must be connected into a single path by extrusionless travel. ToContinuousPath (Algorithm 4) greedily connects each path in an island with extrusionless travel. Nearest finds the nearest path to the given path in the input set of paths. After this procedure has been invoked, an island may be treated as a sequence of motion segments. So, in Algorithm 1 islands[0][0][0] refers to the first motion segment in the first island in the first layer of the model.

Algorithm 4: ToContinuousPath. Greedily connects the printed paths in an island object with non-extrusion travel.

```
Input: An island object I, the cutoff for adding non-extrusion travel, E.
Output: A continuous tool-path involving all printed motions in I
connected by non-extrusion travel.
1: procedure ToContinuousPath(I, E)
2:     current ← I.outer
3:     path ← ∅
4:     while current * I.end do
5:         next = Nearest(current)
6:         if Dist(current, next) > E then
7:             Add a travel motion segment from current.e to next.b
8:         end if
9:         ret.add(current)
10:        current = next
11:    end while
12: end procedure
```

These island-paths are then greedily combined into a single path using the BufferedGreedy (Algorithm 5) optimization approach.

Algorithm 5: BufferedGreedy. Applies a greedy heuristic over a series of buffers to generate a new continuous path.

Input: A sequence of sequences of island objects where the outer sequence represents layers and the inner sequences represent the islands in each layer.
Output: A fully continuous list of motion segments in sequential order ret with all continuous printed motions connected by non-extrusion travel.
```
 1:  procedure BufferedGreedy(L, h)
 2:      printed ← [0, 0, . . . , 0]              ▷ len(printed) = #islands
 3:      r ← ∅
 4:      bufmin ← L[0][0].z
 5:      Z ← 0
 6:      islandBuf ← ∅
 7:      for current = L[0] . . . L[len(L) − 1] do
 8:          Z ← current[0].z
 9:          if |Z − bufmin| ≥ h then
10:              bufmin ← Z
11:              l ← Greedy(islandBuf)
12:              r.add(Span(r[len(r) − 1], l[0]))
13:              r.add(l)
14:              islandBuf ← ∅
15:          end if
16:          if current is the last element in L then
17:              islandBuf.add(current)
18:              l ← Greedy(islandBuf)
19:              r.add(Span(r[len(r) − 1], l[0]))
20:              r.add(l)
71:              break
22:          else
23:              islandBuf.add(current)
24:          end if
25:      end for
26:      return r
27:  end procedure
```

Accounting for the printerhead, chunks of height h are considered to ensure that the bounding box of the printerhead, C, is a meaningful abstraction. Above C there is no guarantee that parts of the printer do not fully sweep a layer while printing an island. Additionally, there may be parts of the printer outside of C that cannot be easily abstracted to simple geometric representation. For example, the nozzle of the printerhead extends about 7 mm below the rest of the printerhead and carriage in the test printer with the extruder, and can be easily bounded whereas the rest of the carriage and printerhead cannot be easily bounded.

The input for BufferedGreedy is a sequence of sequences of island objects in which iterating over the outer sequence represents iterating over the layers of the model and the inner sequences are the islands in the appropriate layer. Here L[0] is the first layer of the model, L[0][0] is the first island in the first layer of the model, and L[0][0][0] is the first motion segment in the first layer of the first island. Remember that the layers are ordered by z value, ascending. The outer portion of BufferedGreedy chunks the model into a series of smaller layer sequences and sends them through the inner Greedy (Algorithm 6) procedure. It is Greedy that actually combines the islands into a single path and returns the path. So, BufferedGreedy divides the model into chunks and adds the connected paths from Greedy onto its output list. Nearest(I, L) finds the nearest island n in the set of islands L to I such that printed[i]=1 for all i∈n.D. The distance between islands I1 and I2 is calculated as Dist(I1[len(I1)−1], I2[0].b), the distance from the last motion of the first island, to the first motion of the second. Span is used to connect islands together using extrusionless travel.

Algorithm 6: Greedy. Combines chunks of the model into continuous toolpaths.

Input: A sequence of sequences of island objects buffer, the array tracking what islands have been printed, printed.
Output: All islands in buffer are tied together into a single continuous path. printed[i.ID] = 1 for all i ∈ buffer.
```
 1:  procedure Greedy(buffer)
 2:      Z ← buffer[0][0].z                       ▷ The z value of the first island in the input.
 3:      r ← ∅
 4:      add all segments in the first island i to r
 5:      remove that island from buffer
 6:      printed[i.ID] ← 1
 7:      while buffer ≠ ∅ do
 8:          nearest ← Nearest(r[len(r) − 1], buffer)
 9:          r.add(nearest)                        ▷ Add all motion segments of nearest to r.
10:          printed[nearest.ID] ← 1
11:          buffer.erase(nearest)                 ▷ remove nearest from buffer and erase its layer sequence if it is empty
12:      end while
13:      return r
14:  end procedure
```

The Span procedure must ensure that lateral motion between islands does not cause collisions with already printed parts of the model. The 3D shortest collisionless path is computed between the two islands in question. Unfortunately finding the shortest path point-to-point among polyhedral obstacles is in general NP-hard, and it is NP-complete even when restricted to axis-aligned boxes. It is possible to efficiently compute shortest paths on the convex hull of the printed model, or to approximate true 3D shortest paths, but to reduce the computation to reasonable levels in our implementation, we simplified the task of routing between islands to a two dimensional problem. When routing between two islands, motions within the height of the current chunk purely in upward the z-axis are guaranteed not to cause collisions by the dependency constraints discussed earlier. In addition, islands at the current level of the printerhead cannot cause collisions with lateral motions because the extruder sits just above the level that it is currently printing at. 3D motion can be simplified through a given chunk by moving the printerhead to the z-value of the higher of the two islands in question. All islands that are already printed above the higher island will be candidates for collision detection. The set of bounding boxes of the already printed islands were compressed into two dimensions and then a union operation over all boxes in the plane was performed. This yields a set of disjoint polygons suitable for constructing a visibility graph. We constructed a visibility graph in this environment and query it to get our collisionless path. This path is not necessarily the shortest possible path, since it might actually be beneficial for the printerhead to travel much further in the z direction for a reduced overall path. Algorithm 7 shows the procedure in detail.

Algorithm 7: Span. Calculates a collisionless path connecting two islands.

Input: Two 3D points a and b, a list of bounding boxes above the higher of a and b.
Output: A path connecting a to b that does not collide with already printed parts of the model.
```
 1:  procedure Span(a,b,L)
 2:      path3d ← ∅
 3:      h ← max(a.z, b.z)
 4:      L ← { BoundingBox(i) | i.z > h }
 5:      obs ← UnionAll(L)
 6:      G ← VisibilityGraph(L ∪ a ∪ b)
```

*Algorithm 7: Span. Calculates a collisionless path connecting two islands.*

```
 7:     path2d ← ShortestPath(G, a, b)
 8:     for p ∈ path2d do
 9:         path3d.add(Point(p.x, p.y, h))
10:     end for
11:     if a.z > b.z then
12:         path3d.add(Point(b.x, b.y, b.z))
13:     else if b.z > a.z then
14:         path3d.add(Point(a.x, a.y, h))
15:     end if
16:     return path3d
17: end procedure
```

Figure 7:
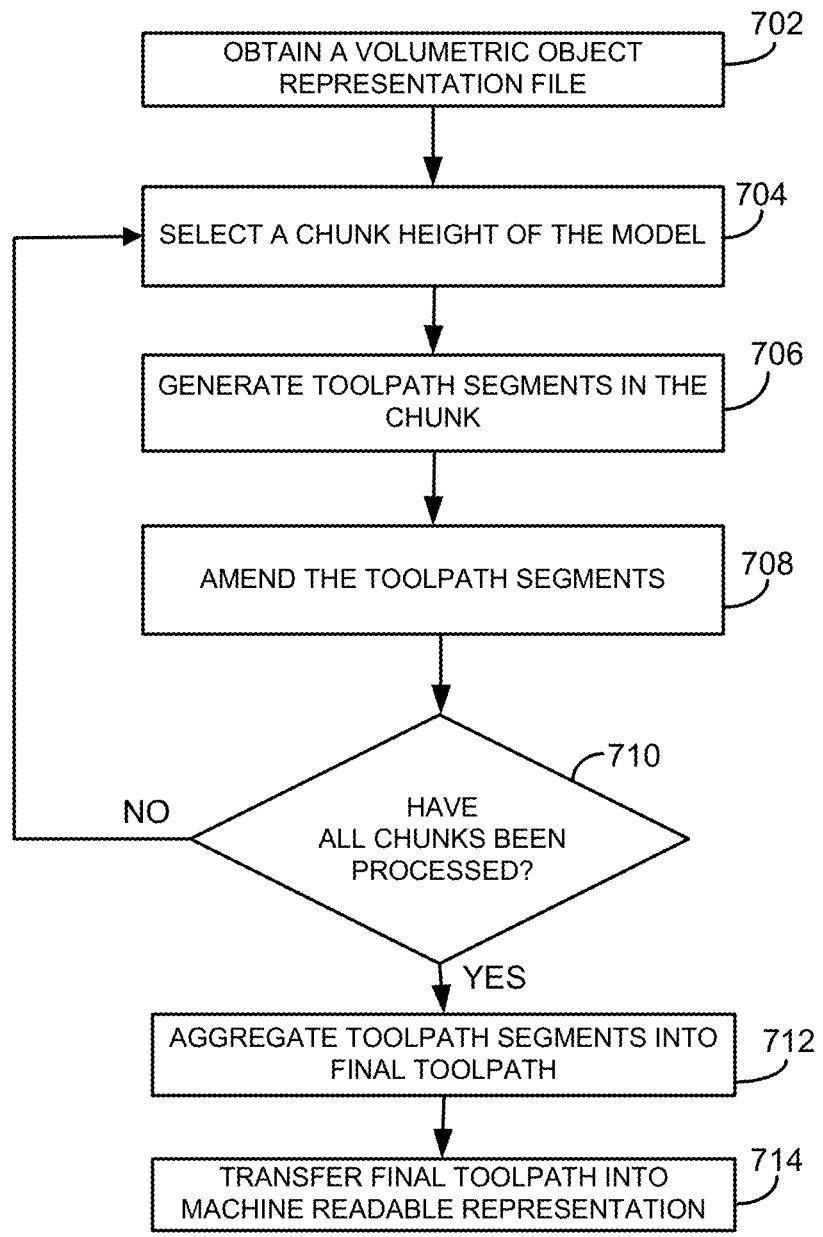
FIG. 7 illustrates a process for generating a toolpath constructed using a chunking technique according to embodiments of the present disclosure.

FIG. 7 illustrates a process for generating a toolpath constructed using a chunking technique according to some embodiments of the present disclosure. At step 702, the tool 108 obtain a volumetric object representation file 110. At step 704, the tool 108 selects a chunk height of the model, and at step 706, generates at least one toolpath segment within a chunk. Then at step 708, the tool 108 amends the at least one toolpath segment.

At step 710, the tool 108 determines whether all chunks have been selected and broken into at least one toolpath segment. If so, processing continues at step 712; otherwise processing continues at step 704 to process the next chunk.

At step 712, the tool 108 aggregates all the toolpath segments into a final toolpath, and at step 714 transfers the final toolpath from an internal representation to an appropriate machine readable representation with hardware specific information.

Figure 6:
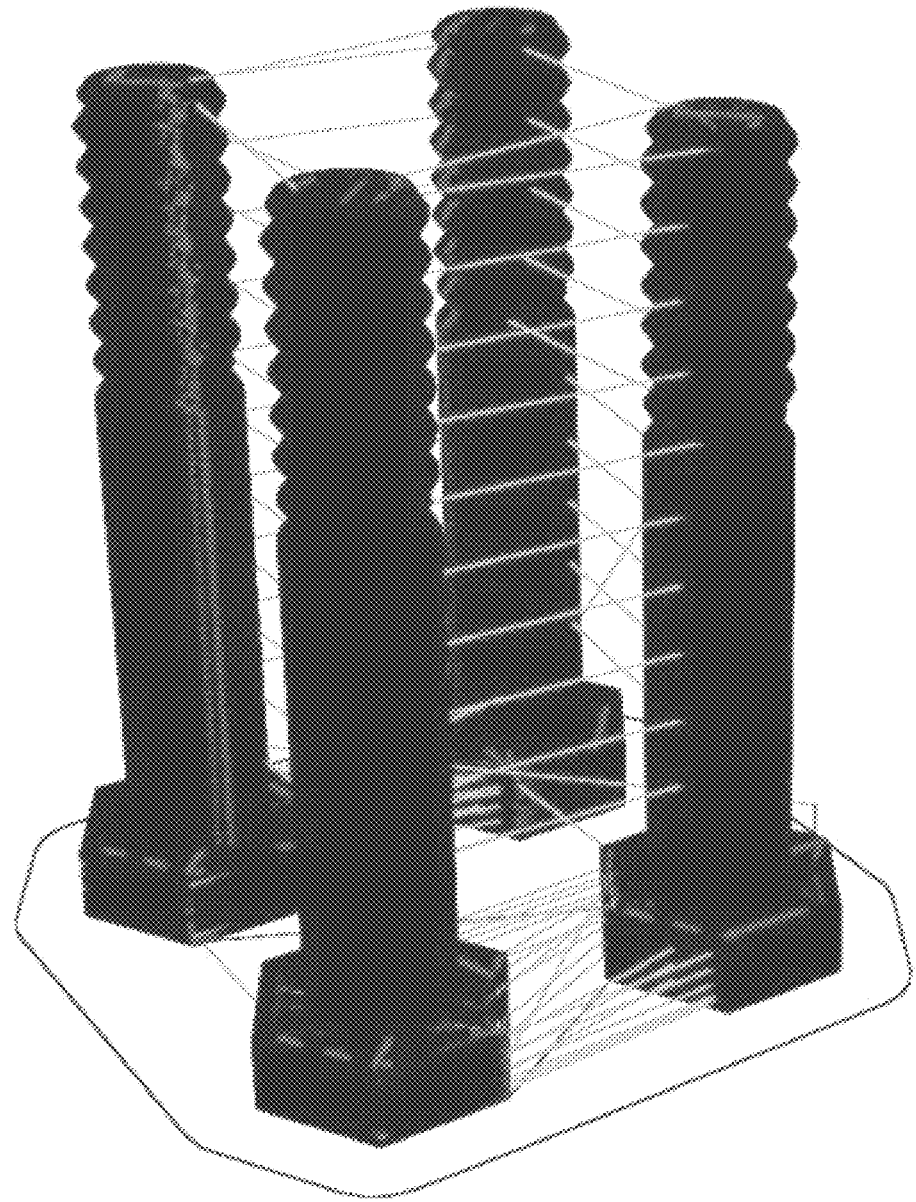
FIG. 6 illustrates an example toolpath for the four identical screws using the tool according to embodiments of the present disclosure.

To demonstrate the efficacy of the present technology, we printed the path shown in FIG. 3 and the altered path shown in FIG. 6. The printed paths were the same, save for the application of our method. With our method applied, we achieved a savings of about 30000 mm of wasted motion, and on the 3Dt printer, this translated to a total print time that was an over an hour faster.

For a more comprehensive evaluation, we constructed a benchmark set of 403 models of varying geometry taken from popular mesh sharing websites. Our benchmark set consists of models that have a wide variety of complexities in terms of the total distance traveled by the printerhead (65 mm-9.6 km), number of faces (36-2.9M), number of islands (2-35K) and the number of layers (2-2.7K). This was done to test the capability of our method on different levels of geometrical complexity.

Figure 5:
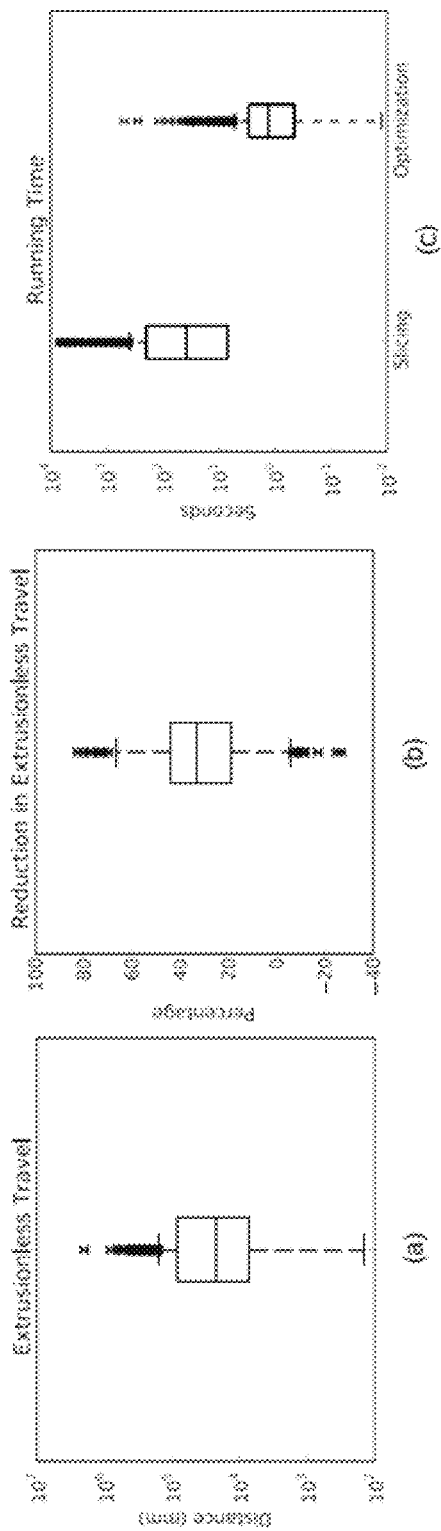
FIG. 5 provides a summary of the performance of the tool according to embodiments of the present disclosure.

To test such a large set of models, we made use of a simulator. The simulator was configured to read a toolpath represented in the NIST RS274NGC G-code standard, compatible with the Marlin firmware. The abstracted toolpath could then be operated on and rendered back into a G-code representation and analyzed. We ran the simulator for each of the 403 models, using parameters appropriate for our test printer. As mentioned previously, the height of the bounding box of the printerhead was set to 7 mm as was the radius. To measure performance we considered the overall reduction in extrusionless travel distance along with the overall time taken by our current implementation. FIG. 5 provides a summary of the performance of our algorithm on our benchmark.

The extrusionless travel in our models produced by a standard slicing-based toolpath, which was obtained with the Slic3r path generator, spans five orders of magnitude (FIG. 5(*a*)), has a mean of 70 m. Our primary figure of merit to characterize the overall improvement afforded by our algorithm is the percentage reduction of extrusionless travel.

FIG. 5(*b*) shows significant overall improvement on nearly all models. The mean and median percentage reductions in extrusionless travel was around 34% over all models. As is evident from the boxplot, the method achieves over a 20% reduction in travel over three quarters of the benchmark.

To evaluate running time, we ran Slic3r and our implementation on a uniprocessor, consumer-grade laptop for all models. The time taken by the algorithm is negligible in all but a few cases (see FIG. 5(*c*)). Typically the algorithm takes on the order of seconds; the mean runtime was 5.8 seconds. It is important to note that although the algorithm can be considered a standalone approach, the method takes the output of a slicing engine as input (so that islands do not have to be computed). Thus the times given in FIG. 5(*c*) are not meant to be head-to-head comparison. Instead the times reported are a reasonable upper bound on the additional overhead for the method. In comparison to the slicing method, this additional cost is on average just a few seconds.

However, a small number of models incurred a longer runtime for optimization. 30 models took longer than 10 seconds and 3 models took longer than 100 seconds with the longest runtime being 485 seconds. But notably, in these (and nearly all) cases, the time taken for slicing dominated by at least a factor of 10. Nevertheless, we profiled the performance of our implementation and found that construction of the visibility graph and computation of shortest path distances became costly in certain instances. That is, the visibility graph and shortest paths must be updated after each greedy choice, which can be time consuming when the current topmost layer of islands is large.

Overall, the method provides a substantial reduction in extrusionless travel in the vast majority of models that were tested. It is important to note that since the method takes a fraction of the time required by slicing, cases in which extrusionless travel is actually increased can simply be eliminated by examining the output of the algorithm to judge whether there is an improvement. In cases where there is a minor improvement, issues such as part quality can also be considered in choosing a toolpath.

In some embodiments, the system 100 may provide fused filament fabrication (FFF) by constructing toolpaths that vary in all three dimensions, rather than successively considering 2D layers. The key motivation is that allowing the printer to print in the z-axis can be beneficial if model features are sufficiently spatially separated. For example, a model that consists of a set of discrete parts that must be assembled may be a compelling example of when a 3D approach would be beneficial. However a 3D method must ensure that a model can be printed in its entirety, i.e., that the planning algorithm will not make a part of the model inaccessible due to printer geometry.

To ensure printability, the system 100 uses a dependency graph that was computed for the input model volumetric object representation file based on the print head geometry. By respecting these dependencies over the course of planning, the toolpath can be ensure to be valid and complete. An efficient greedy algorithm that attempted to print local features in the z-direction to the extent possible may be used. The efficient, greedy algorithm may remove, on average, 34% of the extrusionless travel (i.e., parts of the toolpath with no fabrication) compared with conventional layer-based techniques. Of course there are a number of important practical issues that must be examined, such as the relationship between the toolpaths and material properties such as curing time, but wasted motion is the single aspect of a toolpath that directly translates to expending unnecessary resources (i.e., time) and directly affects the cost and throughput of manufacturing.

According to certain embodiments, a local search algorithm (Algorithm 8) may be provided that achieves additional significant reductions in extrusionless travel. The local search algorithm utilizes a robust local search procedure that may be less myopic than a simple greedy algorithm, but is still can be faster than layer-based methods. Most importantly, on a prior benchmark of over 400 models, the local search algorithm can achieve a mean/median reduction of extrusionless travel of 62% over layer-based methods and thus an additional 28% over the simple greedy algorithm. Additionally, the local search algorithm is more robust in that it reduces extrusionless travel on a substantial number of model in the benchmark, in contrast to the simple greedy algorithm. Finally, in light of such large improvements, it is attempted to characterize the optimality of the toolpaths generated by our new algorithm. A novel integer linear programming formulation of toolpath planning using the asymmetric Traveling Salesperson Problem with precedence constraints was developed. In combination with the bounds used in the local search algorithm, the linear programming relaxation of this formulation provides lower bounds on optimality for a given input model. While lower bounds were obtained for a subset (e.g., approximately 30 model) of the benchmark, it was found that a large portion of the results were close to the lower bound and are also able to rationalize how our local search method could be improved.

Since traditional FFF printing proceeds layer-by-layer, it is easy to see that the target object can always be printed correctly (subject to support and printer constraints). Since this approach diverges from traditional methods by printing in 3D, a mechanism for ensuring that a model can always be printed using the present technology is provided. In general a toolpath is printable if all parts of the path have a proper support structure and if the print head will not intersect already printed parts of the model while traversing the path.

The first step of the 3D aware toolpath construction is to extract the required line segments, and then the contours, of the model. The contours of the model are the continuous printed motions that make up the model. This is in contrast to previous embodiments described above that initially clustered the contours into islands. The contours can be extracted from the line segments describing the model by connecting the segments together at their endpoints. The contours were labeled as open if the print head were not at the same location after printing all points along the contour, and closed otherwise. Once these contours are extracted, a dependency graph was computed whose vertices are the contours and whose directed edges (u, v) specify that, for contours u and v, that u must precede v in the toolpath.

While it is possible to specify the set of dependencies that must be followed in constructing a toolpath, it is not straightforward to then generate a compact, static, distance-graph based model that captures the optimal toolpath. This is because the costs of all motions that happen in the future are directly affected by the history of choices in two respects. First, newly extruded material must be avoided, increasing the cost of some edges at every choice. Second, the print head must move along a contour without revisiting any node. It is the responsibility of the path planning algorithm to decide which point of each contour is the start point and which point is the end point. This choice can have an impact on final solution quality. For instance, the algorithm may recognize and use a contour as a means of transport between two spatially distant parts of the model. A successful algorithm will be able to locate and leverage points where it can make use of the printed motion to travel between parts of the model. The simple greedy algorithm tends to choose traveling to the next available contour in the next layer, rather than traveling laterally which leads to poor solutions in many models.

In order to locate situations where the system can generate a toolpath to travel through the model, an efficient way to calculate the beginning and ending points of printing out a contour may be needed. Each contour's beginning point will depend on the history of choices of the contours, and how this has positioned the print head previously. This means that any choice of a new contour will depend on the way the previous contours have been printed. That is, the optimal next choice of beginning point is dependent on the previous optimal choices. The endpoint of a contour is uniquely determined by the choice of starting point. Deciding on the beginning and ending points of a contour may be referred to as a justification of the contour.

To describe the set of all possible solutions in a static format usable by existing combinatorial optimization algorithms may require numerous resources. Instead, we define a lower bounding problem to the printing problem. An optimal solution on this problem is a lower bound to the optimal solution in our domain. We obtain a lower bounding problem instance by using a distance measure that lower bounds the distance between two contours by assuming that the contours have beginning and ending points chosen such that the distance between them is as low as possible. More formally, the vertex distance between two contours c1 and c2 is the minimum Euclidean vertex distance between the endpoints of the contours. If a contour is closed, any point may be considered an endpoint. Thus, the optimal path length to this problem with the original dependency graph is a lower bound for the optimal toolpath length and thus the minimum extrusionless travel. Using the definition, it may be possible to capture some of the idea of the effect of a choice on the solution path costs without fully recomputing the model. We use it in a local search algorithm as a way to filter out candidate solution changes in constant time. It may be important to note that the local search algorithm efficiently estimates point to point travel in the course of evaluating moves in the local search. The problem may be structured by introducing a source and sink node in the dependency graph so that all valid tours begin with the source and end with the sink. Each motion from the source and to the sink is given zero cost. By doing this we allow our heuristic to solve the problem of selecting the best starting point for the traversal.

At the outset, the local search procedure requires a valid initial solution represented as an ordered list of contours. In an example implementation, an initial solution is constructed by choosing an arbitrary starting point and repeatedly choosing the closest feasible contour to append to the solution. Using this as the initial solution, the local search step iterates using three position variables h, i and j. These position variables are used to define path left, consisting of the nodes (h+1 . . . i) and path right consisting of the nodes (i+1 . . . j). At each iteration, an attempt to swap path left with path right is made. To deal with dependencies, it should be ensured that no node in path right depends on a node in path left. This can be accounted for in constant time maintaining a global variable f mark. At each choice of i, the dependencies d of the node i are labeled with h by setting f mark[d] to h. At each choice of j, check if that node is dependent on one of the nodes in path left by verifying if it has been labeled at this iteration of h. If so, the iteration is terminated and moved to the next value of h.

---

Algorithm 8 Locally optimizes a list of contours.

---

Input: A dependency graph G computed for a list of contours, an initial solution, S, of length n.
Output: A feasible solution.
1: procedure LOCALSEARCH(S, G)
2:     h ← 0
3:     lb ← SOFTLB(S)
4:     cost ← TIGHTLB(S)
5:     for h ∈ 1...n −4 do
6:       for i ∈h + 1...h + 3 do
7:         for d ∈DEPENDENCIESOF(S[i], G) do
8:           f mark[d] ←h
9:         for j ∈i + 1...min{i + 200, n − 1} do
10:           if f mark[S[j]] = h then
11:             Break
12:           if SOFTLB(S, h, i, j) < lb then
13:             if TIGHTLB(S) < cost then
14:               CHANGESOLUTION(S, h, i, j)
15:               cost ←TIGHTLB(S)
16:               lb ←SOFTLB(S)
17:               Break
18: return S
19: end procedure

---

In order to keep run times within a reasonable bound, the tool 108 may be limited to re-arranging vertices (e.g., exchanges) within a relatively small neighborhood of the current vertex. For example, in line 6, the tool 108 only considers relocating chains of edges up to a specified length of three. In addition to this, the innermost loop is limited to at most 200 vertices (e.g., nodes) away from the iteration's start node. The procedure SOFTLB computes the sum of the edge costs of the lower bounding vertex distance. When given the indices describing a possible change, it is able to leverage our search order to compute the new solution cost in constant time. If this new cost is larger than the previous lower bound, we may eliminate the candidate solution. The procedure TIGHTLB computes the justification for each contour, and uses the straight line vertex distance between the beginning and ending points of the contours as a distance measure. This yields a relatively tight lower bound on the solution cost, but in some cases, can be expensive to compute.

A simple model for the dependency graph has been described, but in practice the model must have a dependency graph structured in such a way that the amount of possible motion in the third dimension is also limited to a reasonable amount. To do this, the tool 108 divides the model into a series of chunks by height. Each chunk includes a dependency in which it must be printed in its entirety before any contour in the next chunk may be visited. In the previous implementation, each chunk was processed in isolation, and a best guess was made as to how to end and begin each chunk, a process that can, in some cases, increase the total solution cost. To overcome this, a dependency graph can be defined over the entire model, ensuring that each contour in the chunks preceding a contour must be printed. We may naively guarantee this by sweeping down the previous chunk with a box of infinite size which will result in n2 dependency relationships in total between chunks. In practice, this could be difficult for models with more than a few thousand contours both because it increases the memory consumption of the software and because it paralyzes any traversal algorithm that must consider all of the dependencies of a contour at each step.

To reduce the amount of relationships between contours in the chunks, new vertices may be introduced into the dependency graph that do not represent a printable part of the model. These new vertices depend on all contours which have no contours depending on them in the previous chunk, and are depended on by all vertices in the following chunk which have no dependencies. This allows the tool 108 to take advantage of as many implied dependencies between contours as possible between the chunks. While constructing a path over the model, the tool 108 may append the new vertex when all of its dependencies are met, and ignore it while computing the cost of a solution.

Another aspect of the toolpath that affects the amount of extrusionless travel is the actual plan of point to point movement between contours when it is necessary. In standard layer-based methods the printer must only move in two dimensions. However, because if the printer is allowed to move in three dimensions, it must guarantee that the print head will not intersect any already printed material while moving between print locations. In the island-based algorithm, the three dimensional model space may be simplified into two dimensions by taking the union of the bounding boxes of each of the contours printed above the highest query location, and constructing a visibility graph over those boxes. This means that at each iteration, the algorithm paid $O(n2 \log n)$ time to construct a collision-free path between contours. In some cases, each move in three dimensions may essentially follow the sides of the triangle spanning the two query points.

In some embodiments, the tool 108 may be implemented with a heuristic 3D planner that maintains an up to date representation of the scene in a spatial index supporting fast intersection queries and fast addition of new obstacles. Obstacles are stored as the 3D axis aligned bounding box of the printed contours, expanding the box in the xy-direction by the extruder radius, and expanding the box downward so that no motion in its footprint is possible. The model space is separated into a series of uniformly sized cubic voxels. These voxels need not be stored literally, but may be referenced by index. Each unique index corresponds to a 3D point in the middle of the voxel. The model space is traversed with the A* search algorithm which is only given the ability to traverse voxels whose center point is not within an obstacle. At each iteration of A*, multiple intersection queries are paid for against the index. In practice, it is often only needed to pay constant time for each query against the index as there are rarely collisions against the model. It is often found that the point to point planner spends the majority of its time moving through empty voids in the model. The performance of the planner can be improved by connecting the end point of the query with the previous planned point when the ray connecting them does not intersect part of the model.

To test the performance of the local search algorithm, a benchmark of 402 models were utilized. The benchmark set consists of models that have a wide variety of complexities in terms of the total distance traveled by the print head (e.g., 65 mm-9.6 km), number of faces (36-2.9M), number of contours (3-31K), and the number of layers (2-2.7K). To test such a large set of models, a simulator was used that was configured to read a tool path represented in the NIST RS274NGC G-code standard, compatible with Marlin firmware. The simulator was run for each of the models using parameters appropriate for the test printer (e.g., the RepRap Prusa i3). To measure performance, the overall reduction was considered in extrusionless travel distance over Slic3r, along with the overall time taken by the current implementation. To evaluate running time, the Slic3r was controlled by a consumer-grade desktop for all models.

Figure 8:
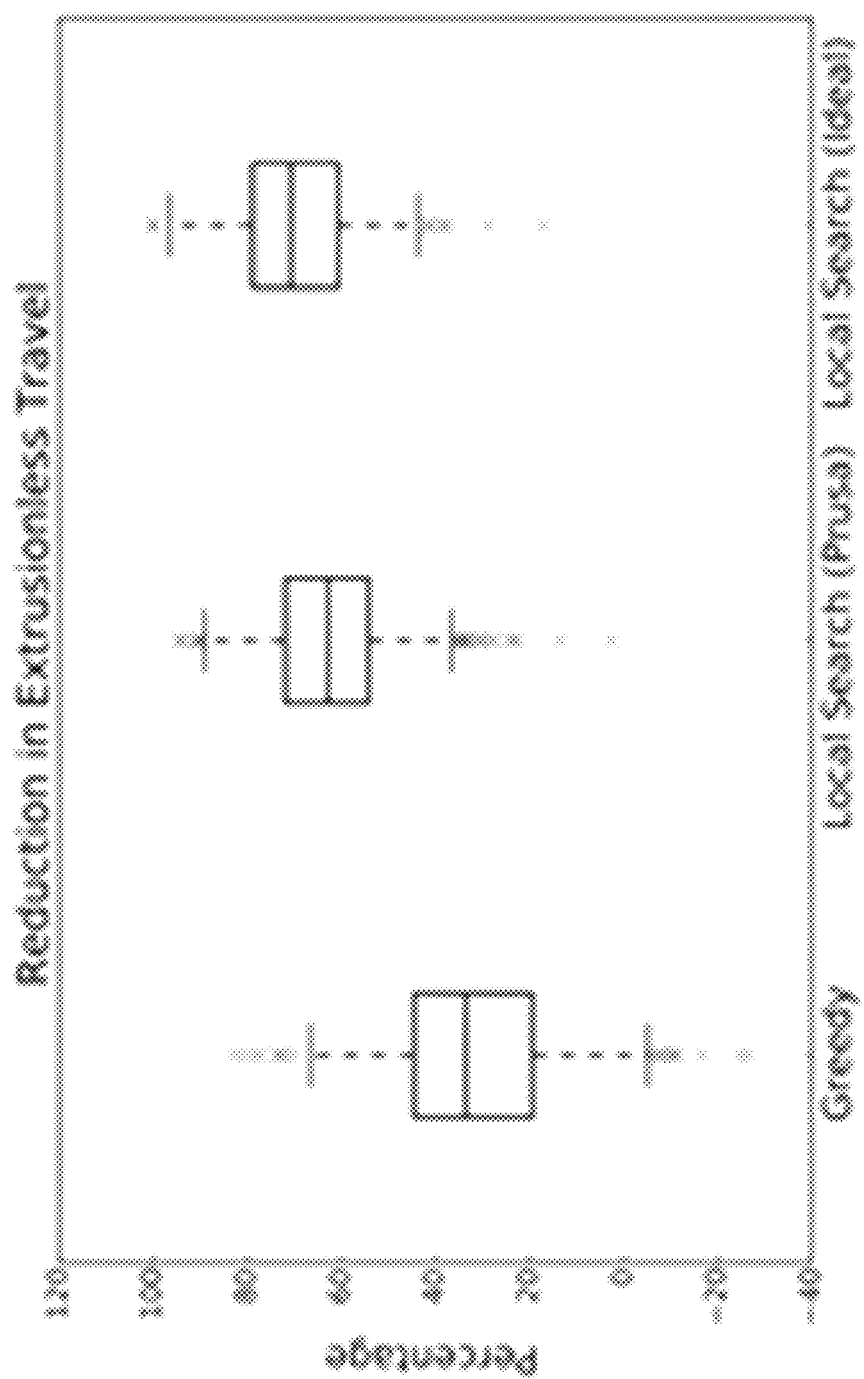
FIG. 8 illustrates an example comparison of extrusionless travel between the local search algorithm versus greedy search algorithm according to embodiments of the present disclosure.
Figure 10:
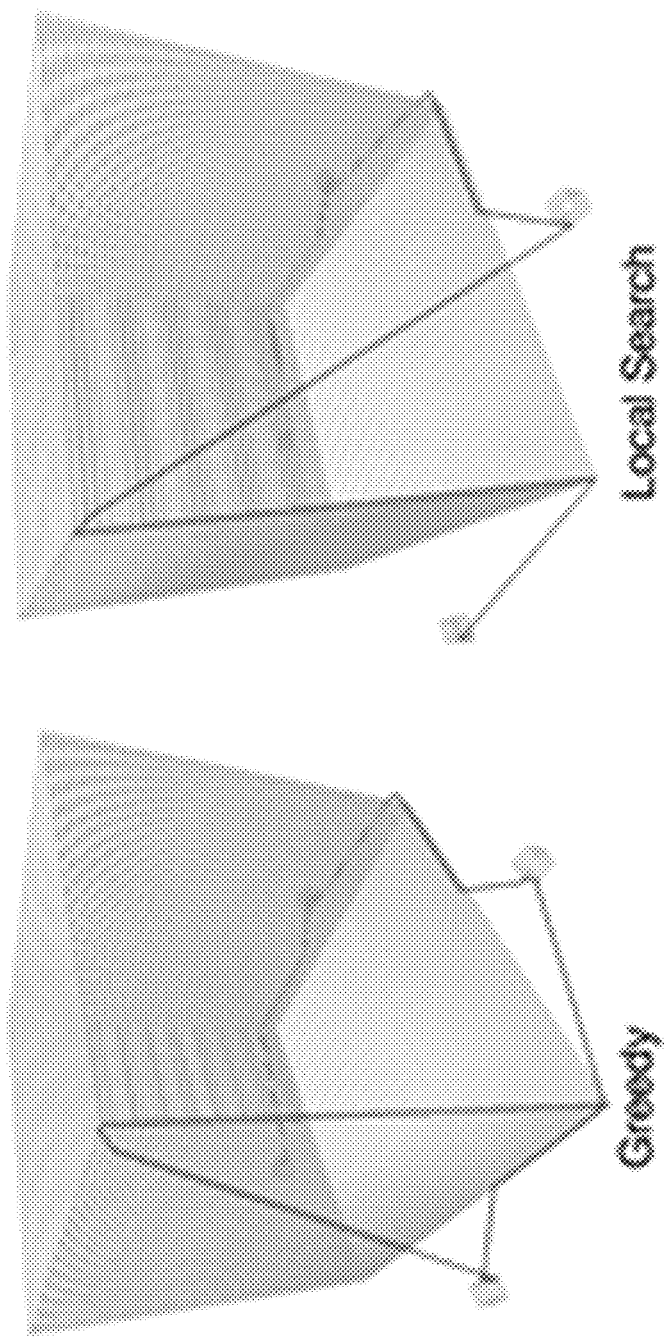
FIG. 10 illustrates an example comparison of motion segments between the local search algorithm versus greedy search algorithm according to embodiments of the present disclosure.

The local search algorithm achieved a 62% mean/median reduction of extrusionless travel over the toolpaths produced by Slic3r as shown in FIG. 8. This represents nearly a 100% improvement from the island-based algorithm. Perhaps even more importantly, the local search algorithm was shown to be more robust than the greedy approach. In the island-based algorithm, the greedy approach in some instances produced a higher level of extrusionless travel than the standard layer-based approach. The local search algorithm produces as good or better output on all models in the benchmark, making it a viable substitute to standard approaches. A pathological case was demonstrated for the greedy choice, which could possibly incur a relatively large amount of extrusionless travel in the z-direction because it would choose to completely print a very small local feature and incur a large travel distance to a partially printed large feature. As demonstrated in FIG. 10, the local search approach is less myopic and can identify this type of case even when there are many local features of varying sizes. We believe the additional level of consideration of alternate solutions provides the robust performance over the benchmark.

Figure 9:
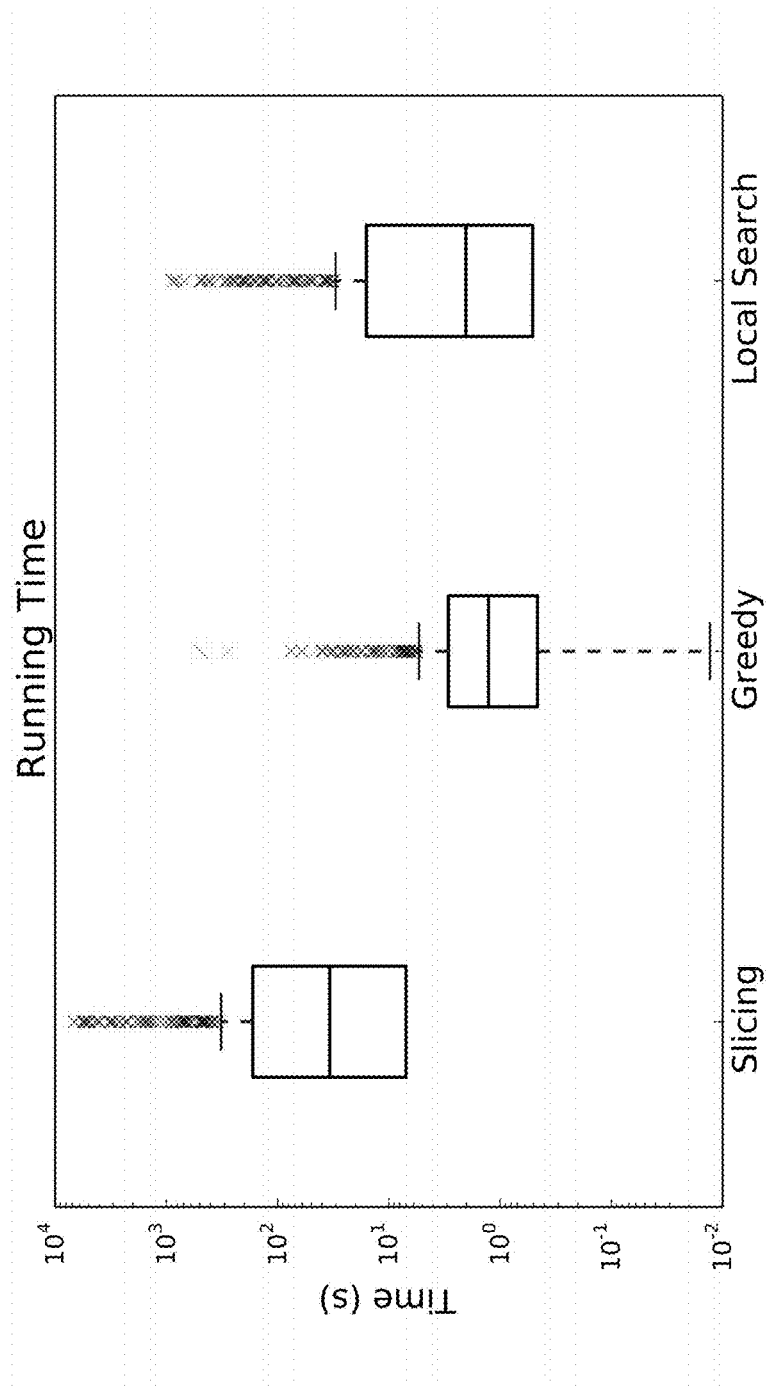
FIG. 9 illustrates an example comparison of running time between the local search algorithm versus greedy search algorithm according to embodiments of the present disclosure.

In terms of running time, the local search algorithm is relatively fast with a median runtime of 2 seconds, as compared to a conventionally used Slic3r, which had a median runtime of 34 seconds as shown in FIG. 9. Because the local search algorithm takes paths produced by conventional implementations of the Slic3r printer as input, this time comparison is not meant to be taken as a head to head comparison. Our previous greedy approach was only slightly faster than our new algorithm, with a median runtime of 1.2 seconds. This slight increase in runtime comes at several significant improvements to the solution quality is still significantly faster than conventional implementations of the Slic3r printer, and of course is accompanied by significantly improved toolpaths.

It may be important to point out that conventional implementations of the Slic3r printer does perform a variety of other optimizations related to part quality that were not considered. It is believed that those optimizations could be incorporated with a different toolpath engine and achieve overall runtimes lower than conventional implementations of the Slic3r printer.

It was demonstrated above that the local search algorithm significantly outperforms both conventional implementations of the Slic3r printer and the island-based greedy algorithm. The impressive improvement achieved by the local search algorithm motivates the question of how close our algorithm is to the best possible toolpath for any given input model. In other words, it was desired to know how close to optimal are the toolpaths generated by the local search approach. The optimality was examined in the generated toolpaths both in terms of the printer geometry, as well as in relation to provable lower bounds on solution quality obtained via linear programming.

The question of optimality was first examined by studying the performance of the local search algorithm when given an "ideal" extruder geometry. That is, the input extruder geometry is set such that the extruder head has no limitations on maneuverability, thus simplifying the dependency graph. Intuitively, this means that the local search algorithm may be free to print local features in their entirety. When executed over the benchmark, it was expected that this configuration of the local search algorithm would produce even less extrusionless travel since part collision constraints would essentially be removed. Indeed, the optimal extrusionless travel for this configuration can be seen to be a lower bound on the optimal extrusionless travel for an extruder configuration, such as the Prusa extruder configuration. As shown in FIG. 8, it was observed that the ideal configuration (e.g., "Local Search (Ideal)") does perform better, achieving a reduction in extrusionless travel of 71%. While this is an improvement upon the results obtained for the Prusa geometry, it is important to note that the performance across the benchmark is essentially uniformly shifted toward this slight improvement. Thus either the Prusa geometry is forgiving enough to achieve nearly the best possible performance (with respect to our local search algorithm), or the local search itself is suboptimal in some fundamental way.

To examine how close local search was to optimal, a linear programming approach was used so that we can compare the performance of the local search algorithm for a given printer geometry to a lower bound derived for that same geometry. The problem can be viewed as constructing an optimal toolpath as a TSP problem in which the precedence constraints are enforced. The underlying TSP graph is defined with contours as vertices and travel between contours that is some lower bound of the possible distance between contours. The precedence constraints are defined by the dependency graph on contours, which ensures the validity of any output toolpath. TSP and thus ATSP are NP-hard, but it is noted that the difficulty of approximating of ATSP is also poorly understood. The current best approximation ratio for ATSP can be approximated by $\Theta(\log n/\log \log b)$, while the best lower bound seems to be just over 1. Moreover, these versions do not even consider precedence constraints.

Rather than running an approximation algorithm, an attempt to compute instance-specific lower bounds using the constraint in which two contours c1 and c2 is the minimum Euclidean distance between the endpoints of the contours. To do this, an integer linear program (ILP) was constructed using an ATSP-PC formulation whose optimal cost corresponds to a lower bound on the minimum possible extrusionless travel. It then also follows that an optimal solution to the LP relaxation of this ILP is also a lower bound on minimum extrusionless travel. ILP instances were generated for the models from the benchmark, and solved the LP relaxation using a Gurobi solver. Exact solutions to the LP relaxation were considered, and results were obtained for 30 of the smallest models in the benchmark before reaching the limit of available computational resources. While it would be desirable to obtain more solutions, the largest model solved was nontrivial, and had several hundred contours.

Of the 30 models, about half of the toolpaths computed by the local search algorithm were within a factor of 1-3 of the LP optimum (and thus within a factor of 1-3 of the true optimal toolpath). The remainder of the toolpaths for these models were within a factor of 4-11 of the LP optimum. It is believed that these results are useful for two reasons. First, the fact that some local search toolpaths match the lower bound show that some of our lower bounding instances are tight. That is, the LP formulation itself cannot likely be significantly improved, and the overly optimistic lower bound utilized in the constraint of two contours c1 and c2 is the minimum Euclidean distance between the endpoints of the contours can be realized for some models. For instances with a larger gap between the lower bound and the achieved result, the local search (i.e., by increasing depth) can be improved, or by improving the construction of the lower bounding graph.

For the former, the local search algorithm was run on the benchmark with a more exhaustive version of the local search algorithm in which the number of iterations was extended by a factor of 5 and also removed the 200 node limitation in the inner loop. The runtime increased significantly, but we observed no significant improvement in the solution quality (e.g., approximately 1%). Thus, it is believed that it is unlikely that a local search approach would do significantly better and that further work should be conducted to tighten the lower bounding graph. The slack in the lower bound can be seen in the case where a series of adjacent closed contours exist without open contours. The lower bound may not reflect the fact that when a beginning point of a contour was selected, the beginning point to travel should be used to the next contour. In the case of many adjacent closed contours, it can radically underestimate the distance, by roughly the diameter of each contour.

Figure 11:
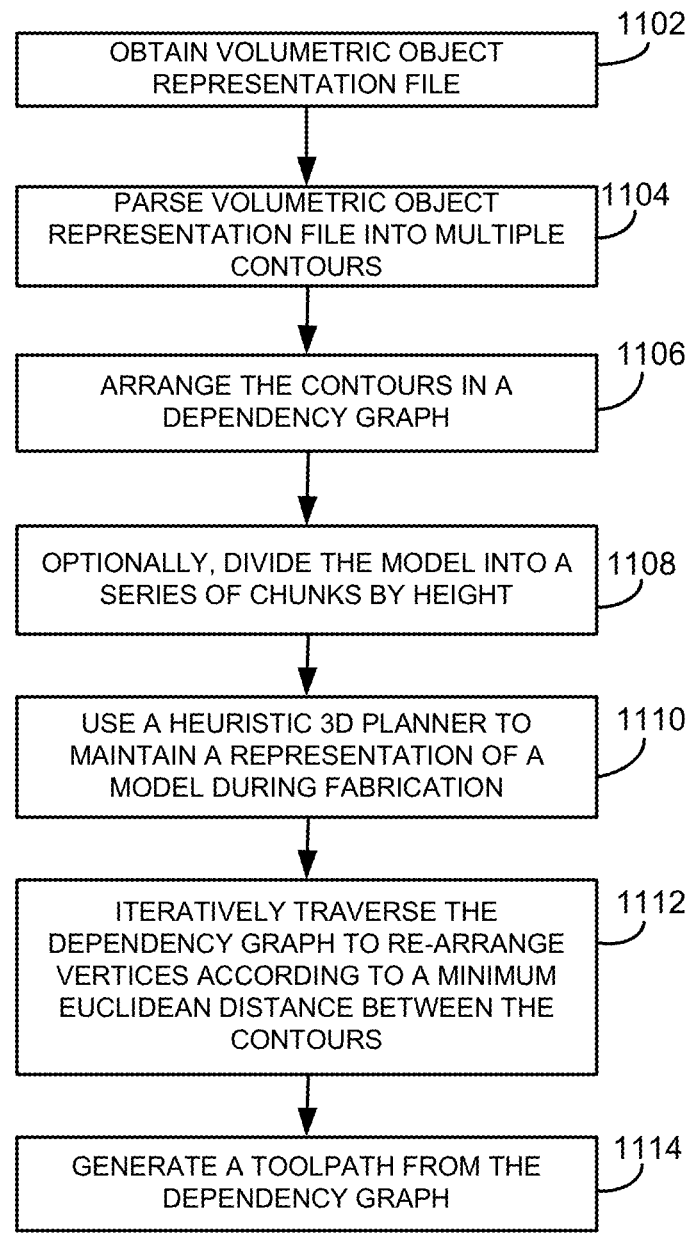
FIG. 11 illustrates an example process for generating a toolpath constructed according to the local search algorithm according to embodiments of the present disclosure.

FIG. 11 illustrates an example process for generating a toolpath constructed according to the local search algorithm according to some embodiments of the present disclosure. At step 1102, the tool 108 obtains a volumetric object representation file. Thereafter at step 1104, the tool 108 parses the volumetric object representation file into multiple contours including one or more line segments of the volumetric object representation file. The contours of the model are the continuous printed motions that make up the model. The contours can be extracted from the line segments describing the model by connecting the segments together at their endpoints.

At step 1106, the tool 108 arranges the contours in a dependency graph including multiple vertices representing the plurality of contours and edges each representing a dependency of a first vertex relative to a second vertex. Next at step 1108, the tool 108 optionally divides the model into a series of chunks by height. Each chunk includes a dependency in which it must be printed in its entirety before any contour in the next chunk may be processed.

At step 1110, the tool 108 may optionally use a heuristic 3D planner that maintains an up to date representation of the scene in a spatial index supporting fast intersection queries and fast addition of new obstacles. In general, obstacles are stored as the 3D axis aligned bounding box of the printed contours that are continually updated to ensure no collisions between the printer head 120 and model 122 occur.

At step 1112, the tool 108 iteratively traverses the dependency graph to re-arrange each vertex according to a minimum Euclidean distance between each of the contours represented by the vertices, and generates a toolpath from the dependency graph at step 1114. The resulting toolpath can be used by the three dimensional printer to print a model defined by the volumetric object representation file.

The previous steps may be repeatedly performed for forming other toolpaths according to other volumetric object representation files 108. Nevertheless, when use of the tool 108 is no longer needed or desired, the process ends.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 12:
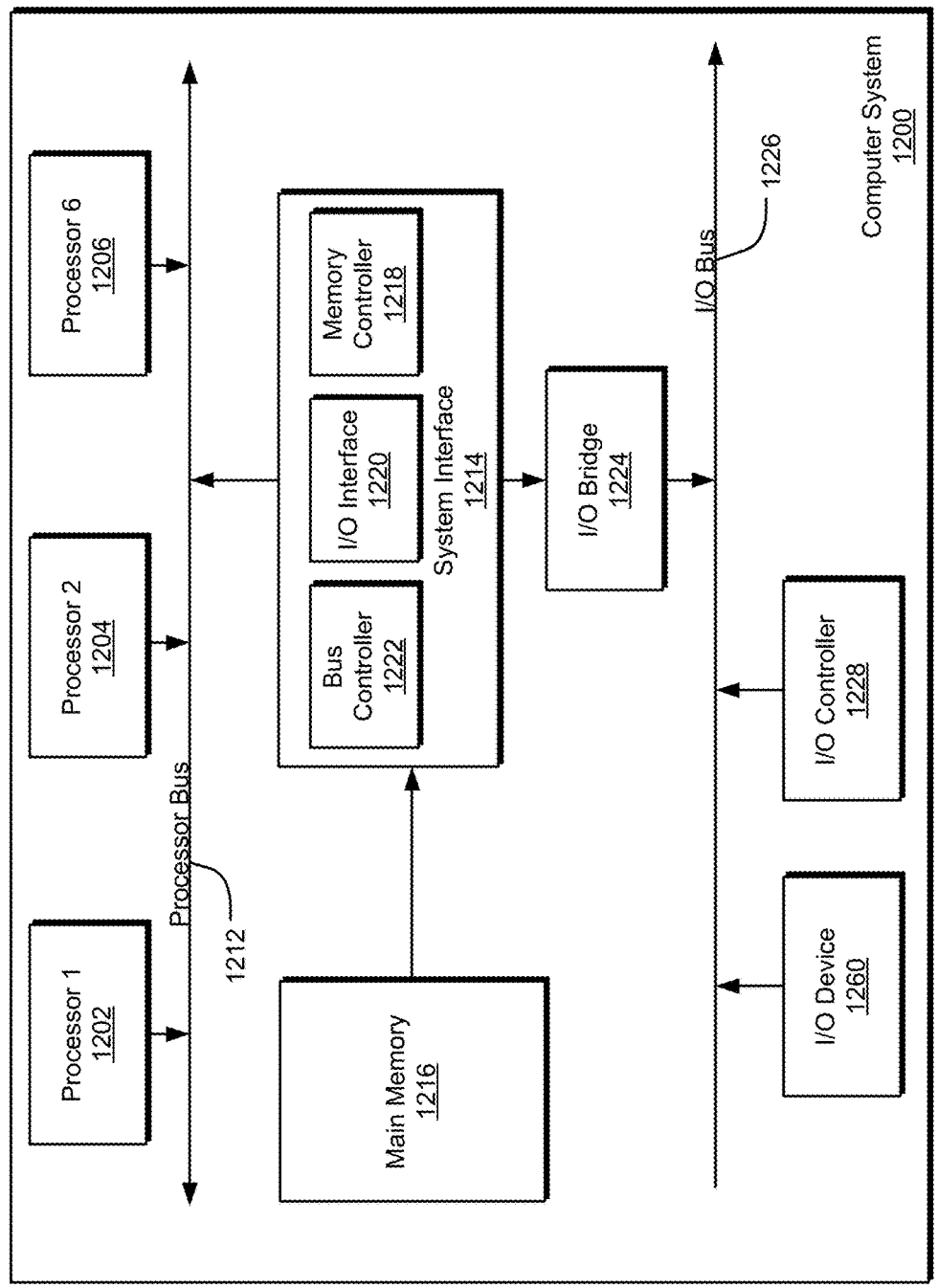
FIG. 12 is a block diagram illustrating an example of a computing device or computer system which may be used in implementing the embodiments of the present disclosure.

For example, FIG. 12 is a block diagram illustrating an example of a host or computer system 1200 which may be used in implementing the embodiments of the present disclosure. The computer system (system) includes one or more processors 1202-1206. Processors 1202-1206 may include one or more internal levels of cache (not shown) and a bus controller or bus interface unit to direct interaction with the processor bus 1212. Processor bus 1212, also known as the host bus or the front side bus, may be used to couple the processors 1202-1206 with the system interface 1214. System interface 1214 may be connected to the processor bus 1212 to interface other components of the system 1200 with the processor bus 1212. For example, system interface 1214 may include a memory controller 1213 for interfacing a main memory 1216 with the processor bus 1212. The main memory 1216 typically includes one or more memory cards and a control circuit (not shown). System interface 1214 may also include an input/output (I/O) interface 1220 to interface one or more I/O bridges or I/O devices with the processor bus 1212. One or more I/O controllers and/or I/O devices may be connected with the I/O bus 1226, such as I/O) controller 1228 and I/O device 1230, as illustrated.

I/O device 1230 may also include an input device (not shown), such as an alphanumeric input device, including alphanumeric and other keys for communicating information and/or command selections to the processors 1202-1206. Another type of user input device includes cursor control, such as a mouse, a trackball, or cursor direction keys for communicating direction information and command selections to the processors 1202-1206 and for controlling cursor movement on the display device.

System 1200 may include a dynamic storage device, referred to as main memory 1216, or a random access memory (RAM) or other computer-readable devices coupled to the processor bus 1212 for storing information and instructions to be executed by the processors 1202-1206. Main memory 1216 also may be used for storing temporary variables or other intermediate information during execution of instructions by the processors 1202-1206. System 1200 may include a read only memory (ROM) and/or other static storage device coupled to the processor bus 1212 for storing static information and instructions for the processors 1202-1206. The system set forth in FIG. 12 is but one possible example of a computer system that may employ or be configured in accordance with aspects of the present disclosure.

According to some embodiments, the above techniques may be performed by computer system 1200 in response to processor 1204 executing one or more sequences of one or more instructions contained in main memory 1216. These instructions may be read into main memory 1216 from another machine-readable medium, such as a storage device. Execution of the sequences of instructions contained in main memory 1216 may cause processors 1202-1206 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1216. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A three dimensional printing system comprising:
   a computing device in communication with a three dimensional printer, the computing device comprising a processor and a memory to store instructions that are executed by the processor to:
   obtain a volumetric object representation file;
   parsing the volumetric object representation file into a plurality of layers to yield a plurality of 2D contours;
   for each layer:
     decomposing the layer into a sequence of continuous paths;
     labeling the paths as open or closed;
     aggregating non-continuous sets of tool paths with a single outer path and zero or more open or closed inner paths into islands; and
     generating one or more motion segments according to each island; and
   aggregating each of the motion segments to form a toolpath, wherein the toolpath is used by the three dimensional printer to print a model defined by the volumetric object representation file.

2. The three dimensional printing system of claim 1, wherein the instructions are further executed to:
   store the islands as a graph G=(V,E), where E=(vi, vj) represents the shortest Euclidian extrusionless motion between the outer edges of two adjacent islands i and j;
   calculate one or more dependencies for each of the islands;
   order the islands into a series of chunks, wherein G is traversed according to the dependency set; and
   connect each island to its adjacent islands in the chunk to form the toolpath.

3. The three dimensional printing system of claim 2, wherein the dependencies comprise at least one of ensuring that while the printerhead will not collide with another island while the printerhead is traversing the paths in one of the islands and when an island is printed, the printerhead will be resting on all islands that are a part of the support structure.

4. The three dimensional printing system of claim 1, wherein the instructions are further executed to optimize the toolpaths according to a physical structure of the printerhead.

5. The three dimensional printing system of claim 1, wherein the instructions are further executed to generate each of the toolpaths by:
   vertically slicing a triangulated mesh according to a set of planes yielding a series of contours;
   ordering the contours to yield the closed outer walls of the model as continuous paths;
   generating offset surfaces in each of the islands; creating an infill path in each of the islands;
   liking the islands to form a final toolpath; and
   transferring the final toolpath from an internal representation to an appropriate machine readable representation with the hardware information.

6. The three dimensional printing system of claim 1, wherein the instructions are further executed to generate an infill structure to fill certain voids in the printed model with material to strengthen the model.

7. The three dimensional printing system of claim 1, wherein the instructions are further executed to form the toolpath by:
   generating a hardware specific information of the three dimensional printer;
   translating the hardware specific information and toolpath into a machine readable interface;
   transmitting the machine readable interface to a three dimensional printer with the hardware information; and
   printing the three dimensional object.

8. The three dimensional printing system of claim 1, wherein the volumetric object representation file comprises G-code instructions.

9. The three dimensional printing system of claim 1, wherein the instructions are further executed to generate the toolpath by:
   repeating the following steps until all chunks of the volumetric representation have been selected and broken into at least one toolpath segment:
   selecting a chunk height of the model;
   generating at least one toolpath segment within a chunk; and
   amending the at least one toolpath segment; and
   aggregating all the toolpath segments into the toolpath.

10. A three dimensional printing method comprising:
   obtaining, using instructions stored on a computer-readable medium and executed by a processor, a volumetric object representation file;
   parsing, using the instructions, the volumetric object representation file into a plurality of layers to yield a plurality of 2D contours;
   for each layer:
      decomposing, using the instructions, the layer into a sequence of continuous paths;
      labeling, using the instructions, the paths as open or closed;
      aggregating, using the instructions, non-continuous sets of tool paths with a single outer path and zero or more open or closed inner paths into islands; and
      generating, using the instructions, one or more motion segments according to each island; and
   aggregating, using the instructions, each of the motion segments to form a toolpath, wherein the toolpath is used by the three dimensional printer to print a model defined by the volumetric object representation file.

11. The three dimensional printing method of claim 10, further comprising:
   storing the islands as a graph G=(V,E), where E=(vi, vj) represents the shortest Euclidian extrusionless motion between the outer edges of two adjacent islands i and j;
   calculating one or more dependencies for each of the islands;
   ordering the islands into a series of chunks, wherein G is traversed according to the dependency set; and
   connecting each island to its adjacent islands in the chunk to form the toolpath.

12. The three dimensional printing method of claim 11, wherein the dependencies comprise at least one of ensuring that while the printerhead will not collide with another island while the printerhead is traversing the paths in one of the islands and when an island is printed, the printerhead will be resting on all islands that are a part of the support structure.

13. The three dimensional printing method of claim 10, further comprising optimize the toolpaths according to a physical structure of the printerhead.

14. The three dimensional printing method of claim 10, further comprising generating each of the toolpaths by:
   vertically slicing a triangulated mesh according to a set of planes yielding a series of contours;
   ordering the contours to yield the closed outer walls of the model as continuous paths;
   generating offset surfaces in each of the islands; creating an infill path in each of the islands;
   liking the islands to form a final toolpath; and
   transferring the final toolpath from an internal representation to an appropriate machine readable representation with the hardware information.

15. The three dimensional printing method of claim 10, further comprising generating an infill structure to fill certain voids in the printed model with material to strengthen the model.

16. The three dimensional printing method of claim 10, further comprising forming the toolpath by:
   generating a hardware specific information of the three dimensional printer;
   translating the hardware specific information and toolpath into a machine readable interface;
   transmitting the machine readable interface to a three dimensional printer with the hardware information; and
   printing the three dimensional object.

17. The three dimensional printing method of claim 10, wherein the volumetric object representation file comprises G-code instructions.

18. The three dimensional printing method of claim 10, further comprising:
   repeating the following steps until all chunks of the volumetric representation have been selected and broken into at least one toolpath segment:
   selecting a chunk height of the model;
   generating at least one toolpath segment within a chunk; and
   amending the at least one toolpath segment; and
   aggregating all the toolpath segments into the toolpath.

* * * * *